(12) United States Patent
Paltashev et al.

(10) Patent No.: US 12,254,527 B2
(45) Date of Patent: Mar. 18, 2025

(54) RECONFIGURABLE VIRTUAL GRAPHICS AND COMPUTE PROCESSOR PIPELINE

(71) Applicant: ADVANCED MICRO DEVICES, INC., Santa Clara, CA (US)

(72) Inventors: Timour T. Paltashev, Santa Clara, CA (US); Michael Mantor, Orlando, FL (US); Rex Eldon McCrary, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 16/879,991

(22) Filed: May 21, 2020

(65) Prior Publication Data

US 2021/0049729 A1    Feb. 18, 2021

Related U.S. Application Data

(63) Continuation of application No. 15/331,278, filed on Oct. 21, 2016, now Pat. No. 10,664,942.

(51) Int. Cl.
*G06T 1/20* (2006.01)
*G06T 1/60* (2006.01)
(Continued)

(52) U.S. Cl.
CPC .............. *G06T 1/20* (2013.01); *G06T 15/005* (2013.01); *G06T 1/60* (2013.01); *G06T 15/80* (2013.01); *G06T 17/10* (2013.01)

(58) Field of Classification Search
CPC ......... G06T 1/20; G06T 15/005; G06T 15/80; G06T 1/60; G06T 17/10
See application file for complete search history.

(56) References Cited

U.S. PATENT DOCUMENTS 8,127,112 B2 * 2/2012 Rhoades ................... G06F 1/10
712/36
9,405,700 B2 * 8/2016 Wingard ............. G06F 12/1027
(Continued)

OTHER PUBLICATIONS

Sunilkumar S. Manvi a, Gopal Krishna Shyam, "Resource management for Infrastructure as a Service ( IaaS) in cloud computing: A survey", Jan. 26, 2013, Elsevier (Year: 2013).*
(Continued)

*Primary Examiner* — YuJang Tswei

(57) ABSTRACT

A graphics processing unit (GPU) includes a plurality of programmable processing cores configured to process graphics primitives and corresponding data and a plurality of fixed-function hardware units. The plurality of processing cores and the plurality of fixed-function hardware units are configured to implement a configurable number of virtual pipelines to concurrently process different command flows. Each virtual pipeline includes a configurable number of fragments and an operational state of each virtual pipeline is specified by a different context. The configurable number of virtual pipelines can be modified from a first number to a second number that is different than the first number. An emulation of a fixed-function hardware unit can be instantiated on one or more of the graphics processing cores in response to detection of a bottleneck in a fixed-function hardware unit. One or more of the virtual pipelines can then be reconfigured to utilize the emulation instead of the fixed-function hardware unit.

20 Claims, 20 Drawing Sheets

(51) Int. Cl.
*G06T 15/00* (2011.01)
*G06T 15/80* (2011.01)
*G06T 17/10* (2006.01)

(56) References Cited

U.S. PATENT DOCUMENTS

| | | | | |
|---|---|---|---|---|
| 9,471,307 B2* | 10/2016 | Giroux | ............... | G06F 9/3838 |
| 9,824,412 B2* | 11/2017 | Sharma | ............... | G06T 15/405 |
| 10,403,022 B1* | 9/2019 | Silva | ............... | G06T 19/00 |
| 2002/0107990 A1* | 8/2002 | Johnson | ............... | H04L 69/161 |
| | | | | 709/201 |
| 2005/0243094 A1* | 11/2005 | Patel | ............... | G06T 15/005 |
| | | | | 345/506 |
| 2007/0030278 A1* | 2/2007 | Prokopenko | ............... | G06F 9/5044 |
| | | | | 345/506 |
| 2007/0030280 A1* | 2/2007 | Paltashev | ............... | G06T 1/20 |
| | | | | 345/506 |
| 2007/0043856 A1* | 2/2007 | Morris | ............... | H04L 67/288 |
| | | | | 709/224 |
| 2010/0293353 A1* | 11/2010 | Sonnier | ............... | H04L 49/101 |
| | | | | 711/170 |
| 2011/0072235 A1* | 3/2011 | Deming | ............... | G06F 12/1027 |
| | | | | 711/E12.001 |
| 2015/0163324 A1* | 6/2015 | Bolotin | ............... | H04L 67/327 |
| | | | | 709/225 |
| 2015/0256435 A1* | 9/2015 | Sum | ............... | H04L 41/12 |
| | | | | 702/62 |
| 2016/0140059 A1* | 5/2016 | Snyder, II | ............... | G06F 13/1605 |
| | | | | 710/113 |
| 2016/0299693 A1* | 10/2016 | Sakdeo | ............... | G06F 3/0673 |
| 2017/0323416 A1* | 11/2017 | Finnila | ............... | G06T 1/20 |
| 2017/0372519 A1* | 12/2017 | Sathe | ............... | G06T 1/60 |
| 2018/0081429 A1* | 3/2018 | Akenine-Moller | ............... | G06F 3/14 |

OTHER PUBLICATIONS

Matthew Eldridge Homan Igehy Pat Hanrahan, "Pomegranate: A Fully Scalable Graphics Architecture", 2000, Stanford University (Year: 2000).*

Yoonjin Kim et al., "Design Space Exploration for Efficient Resource Utilization in Coarse-Grained Reconfigurable Architecture", Oct. 2010, IEEE (Year: 2010).*

Greg Humphreys et al. "Chromium: A Stream-Processing Framework for Interactive Rendering on Clusters", 2002, ACM (Year: 2002).*

Hyunchul Park Yongjun Park Scott Mahlke, "Polymorphic Pipeline Array: A Flexible Multicore Accelerator with Virtualized Execution for Mobile Multimedia Applications", Dec. 16, 2009, ACM (Year: 2009).*

Jonghee W. Yoon, Aviral Shrivastava, Sanghyun Park, Minwook Ahn, and Yunheung Paek, "A Graph Drawing Based Spatial Mapping Algorithm for Coarse-Grained Reconfigurable Architectures", Nov. 2009, IEEE (Year: 2009).*

Nickolls et al, "Graphics and Computing GPUs", 2009, NVIDIA (Year: 2009).*

Matthews et al., "Polyblaze: From One to Many. Bringing the Microblaze Into the Multicore Era With Linux SMP Support", 2012, IEEE (Year: 2012).*

CN102541616A—Embedded operating system virtual machine and implementation method thereof—Google Patents, 2012 (Year: 2012).*

* cited by examiner

RECONFIGURABLE VIRTUAL GRAPHICS AND COMPUTE PROCESSOR PIPELINE

CROSS-REFERENCE TO RELATED APPLICATIONS

The present application is a continuation application of U.S. patent application Ser. No. 15/331,278, entitled "Reconfigurable Virtual Graphics and Compute Processor Pipeline", and filed on May 21, 2020, the entirety of which is incorporated by reference herein.

BACKGROUND

Description of the Related Art

A conventional graphics pipeline for processing three-dimensional (3-D) graphics is formed of a sequence of fixed-function hardware block arrangements supported by programmable shaders. These arrangements are usually specified by a graphics application programming interface (API) processing order such as specified in specifications of Microsoft DX 11/12 or Khronos Group OpenGL/Vulkan APIs. One example of a conventional graphics pipeline includes a geometry front-end that is implemented using a vertex shader and a hull shader that operate on high order primitives such as patches that represent a 3-D model of a scene. The arrangement of the fixed function hardware defines the sequence of processing in the graphics pipeline. The fixed function hardware also prepares and provides data to the programmable vertex shader or hull shader, as well as other shaders in the graphics pipeline that are being executed using a common pool of unified compute units. The geometry front-end provides the high order primitives like curved surface patches to a tessellator that is implemented as a fixed function hardware block. The tessellator generates lower order primitives (such as triangles, lines, and points) from the input higher order primitives. Lower order primitives such as polygons are formed of interconnected vertices. For example, common objects like meshes include a plurality of triangles formed of three vertices. The lower order primitives are provided to a geometry back-end that includes a geometry shader to replicate, shade or subdivide the lower order primitives. For example, massive hair generation can be provided via functionality of geometry shader. Vertices of the primitives generated by the portion of the graphics pipeline that handles the geometry workload in object space are then provided to the portion that handles pixel workloads in image space, e.g., via primitive, vertex, and index buffers as well as cache memory buffers. The pixel portion includes the arrangements of fixed function hardware combined with programmable pixel shaders to perform culling, rasterization, depth testing, color blending, and the like on the primitives to generate fragments or pixels from the input geometry primitives. The fragments are individual pixels or subpixels in some cases. A programmable pixel shader then shades the fragments to merge with scene frame image for display.

Draw commands are used to initiate sequential processing of geometry objects in the conventional graphics pipeline. The draw commands define objects in the scene and include geometry data that defines surface geometries, coloring, or texturing of surfaces of the objects. The draw commands are preceded by state information blocks or commands that configure programmable shaders to process properly the corresponding objects. In some cases, the state information includes shader programming code or processing kernels. The geometry data and the state information synchronously move down the graphics pipeline, which sequentially processes the geometry data for each object based on the state information for the object. For example, shaders in the geometry front-end can be programmed to process geometry data for an object using state information for the object. Multiple objects/primitives share the same state information in some cases. The processed object is then passed to the tessellator, which generates lower order primitives and provides the lower order primitives to the geometry back-end. The geometry shader in the geometry back-end is programmed to process the lower order primitives using the associated state information. Fixed function hardware in the pixel portion of the graphics pipeline generates fragments based on the processed lower order primitives received from the geometry back-end. The fragments are provided to the pixel shader for shading combined with hidden surface removal and other visualization flow procedures.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
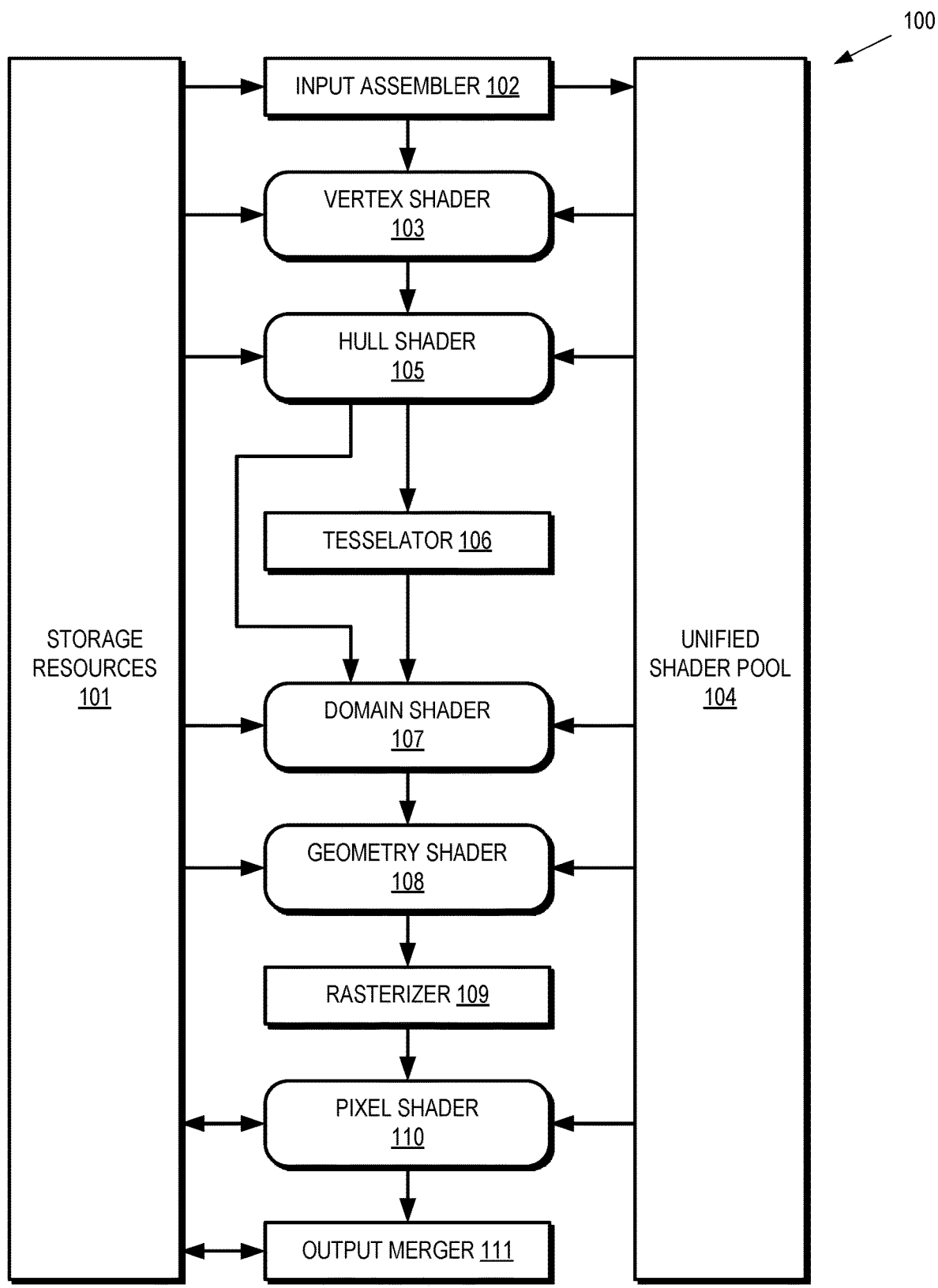
FIG. 1 depicts a first example of a graphics processing system that is compliant with graphics API specifications.

The overall framework of the fixed function hardware blocks defines the shape of a conventional graphics pipeline and determines a maximal throughput of the graphics pipeline. For example, the maximal throughput is typically determined by a subset of the hardware blocks that are bottlenecks for the processing flow. Different applications can generate bottlenecks at different blocks in the graphics pipeline, which can lead to pipeline imbalances that result in some stages (or hardware blocks) idling without any tasks to perform while other stages (or hardware blocks) are bottlenecks because they are unable to keep up with their assigned tasks. Furthermore, new algorithms for scene generation and new requirements to display image fidelity are likely to completely change the distribution of processing bottlenecks across multistage graphics pipelines.

Furthermore, processing objects in a graphics pipeline that is defined by the fixed function hardware blocks reduces the flexibility of the graphics pipeline and can lead to redundant processing that unnecessarily consumes resources of the graphics pipeline. For example, virtual reality techniques such as light field rendering or holographic rendering can require rendering portions of a scene from thousands of different perspectives. Each object must be processed through the entire graphics pipeline for each perspective. However, processing of objects in the programmable shaders in the geometry front-end, the fixed function tessellator, and other programmable shaders or fixed function hardware are independent of the rendering perspective. Consequently, operations of these shaders or fixed function hardware are unnecessarily repeated during rendering of each of the different perspectives. For another example, foveation is used to compress information that represents rendered images provided to different eyes by reducing the image resolution at larger distances from the points of gaze of the eyes. Processing the same object through the entire conventional graphics pipeline once for each eye (i.e., once for each of the different points of gaze) unnecessarily duplicates operations of many of the programmable shaders and fixed function hardware in the graphics pipeline.

Virtualization of a graphics processing unit (GPU) so that it functions as a shared resource is conventionally used to support a multi-user environment in workstations and data centers. In software-based virtualization technologies, graphics device drivers on client machines (instead of the embedded GPUs) communicate with special hypervisor software that manages access to the plurality of shared or virtualized GPUs. Shared virtual GPUs could be implemented remotely (e.g., in data centers) or locally (e.g., in desktop workstations). An example of an industry technology for sharing virtual GPUs (vGPUs) across multiple virtual desktop and applications instances is GPU NVIDIA GRID™. The AMD Multiuser GPU also works with hypervisor software to provide ease of installation of client virtual graphics support environment. Unlike the pure software virtualization approach implemented in the NVIDIA GPU, AMD's hardware-based virtualization solution makes it even more difficult for a hacker to break in at the hardware level.

All current GPUs used in virtual shared mode suffer from significant overhead on user/context switch between different clients that are sharing the resources of the GPUs. In some cases, the overhead becomes comparable to the resources consumed by processing runs due to the significant increase of computational power. Consequently, relying on a fixed configuration of GPUs that operates as a single device may cause performance/power inefficiency when it is shared between clients with different processing profiles. As discussed herein, GPU virtualization can be extended to overcome such problems. For example, GPU complexity is increasing significantly and the available physical resources of the GPU can include billions of transistor blocks, which requires moving beyond conventional device-level virtualization towards internal GPU block-level virtualization. Reconfigurable GPUs with virtualized pipelines components, such as described herein, can support numerous different processing configurations that provide optimal power/performance for different execution profiles of different virtual clients that are sharing the same physical GPU device. Providing the user with the capability to shape a virtual pipeline by defining the components and configuration enables the resources of the GPU to be shared by different tasks with user-defined dispatch and synchronization. The reconfigurable GPU with virtualized pipeline components is therefore a significant change in the conventional GPU usage paradigm for both graphics and compute applications.

Physical resources of a graphics processing unit (GPU) such as shader engines and fixed function hardware units are used to implement user-defined reconfigurable virtual pipelines that share the physical resources of the GPU. Each virtual pipeline is fed via one or more queues that hold commands that are to be executed in the virtual pipeline and a context that defines the operational state of the virtual pipeline. Some embodiments of the queues are implemented as ring buffers using a head pointer and a tail pointer. The commands include draw commands and compute commands. The draw commands include state information or geometry data including information associated with vertices of primitives. The compute commands include kernel code or a reference (such as a pointer or an index) to code, arguments, barriers, and the like.

Virtual pipelines are composed of user-defined reconfigurable fragments including a super-pipe fragment (SPF), a meta-pipe fragment (MPF), and one or more virtual pipe fragments (VPFs) that represent configured shaders and fixed function hardware or, in some embodiments, emulations of fixed function hardware. The SPF implements an upper-level state machine that is used to dispatch/manage multiple queues of command packets for the virtual pipeline, as well as the interaction between application threads and the physical resources that are allocated to the virtual pipeline via an operating system (OS) or low level driver (LLD). The MPF fetches command packets from the queue or, in the case of an indirect fetch, the MPF fetches a pointer or an index from the queue that indicates another location that stores the command packet. After dereferencing of the command and data flows, the MPF provides the retrieved commands and data to virtual pipeline. Each VPF implements user-configurable functionality using an allocated set of physical resources of the GPU such as shader engines, compute units, micro-engine cores, fixed function hardware units, and the like. The VPFs can also be mapped to memory hierarchy resources in the GPU. The physical resources that are available for allocation to the VPFs are referred to as physical processing pipe fragments (PPFs), which include processing resources and associated buffers or interfaces. Any number of VPFs can be chained together and configured to form the virtual pipeline based on requirements of the application or thread that is to be executed using the virtual pipeline.

The reconfigurable graphics pipeline can be shaped as one single powerful virtual graphics pipeline or multiple virtual graphics pipelines of different configurations that operate concurrently using the same pool of shared graphics processing resources. For example, the processing resources of a unified shader pool, such as multiple graphics processing cores, can be allocated as SPFs, MPFs, VPF and PPFs to support a plurality of virtual pipelines. Dynamic reconfiguration of the graphics pipeline can also be used to alleviate bottlenecks in the processing flow. In some embodiments, fixed function hardware becomes a bottleneck in the virtual pipeline, in which case one or more VPFs can be used to emulate the functionality of the fixed function hardware to provide additional processing resources to unclog the bottleneck and avoid idling of other portions of the graphics pipeline. Arbitration is used to decide whether to process objects using the fixed function hardware or the emulation and provide the ability to share PPFs between multiple virtual pipelines.

FIG. 1 depicts a first example a state-of-the-art graphics processing system compliant with graphics API specifications. The first example graphics processing system includes a graphics pipeline 100 that is capable of processing high-order geometry primitives to generate rasterized images of three-dimensional (3-D) scenes at a predetermined resolution. The graphics pipeline 100 has access to storage resources 101 such as a hierarchy of one or more memories or caches that are used to implement buffers and store vertex data, texture data, and the like. An input assembler 102 is configured to access information from the storage resources 101 that is used to define objects that represent portions of a model of a scene. A vertex shader 103, which can be implemented in software, logically receives a single vertex of a primitive as input and outputs a single vertex. Some embodiments of shaders such as a vertex shader 103 implement massive single-instruction-multiple-data (SIMD) processing so that multiple vertices can be processed concurrently. The graphics pipeline 100 implements the concept of unified shader model so that all the shaders included in the graphics pipeline 100 have the same execution platform on the shared massive SIMD compute units. The shaders, including the vertex shader 103, are therefore implemented using a common set of resources that is referred to herein as the unified shader pool 104. A hull shader 105 operates on input high-order patches or control points that are used to define the input patches. The hull shader 105 outputs tessellation factors and other patch data.

Primitives generated by the hull shader 105 can optionally be provided to a tessellator 106. The tessellator 106 receives objects (such as patches) from the hull shader 105 and generates information identifying primitives corresponding to the input object, e.g., by tessellating the input objects based on tessellation factors provided to the tessellator 106 by the hull shader 105. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive. The granularity of the tessellation can be configured based on a required level of detail, which is typically determined by the relative position of the object represented by the higher-order primitives and a camera that represents the viewpoint used to render the image of the scene including the object. Objects that are closer to the camera require higher levels of detail and objects that are further from the camera require lower levels of detail. Depending on the required level of detail, tessellation can increase the number of lower-order primitives in the graphics pipeline by orders of magnitude relative to the number of input higher-order primitives. Some of the primitives produced by the tessellator 106 are micropolygons that represent an area that is less than or approximately equal to the area of a single pixel on the image space or the screen used to display the rendered image.

A domain shader 107 inputs a domain location and (optionally) other patch data. The domain shader 107 operates on the provided information and generates a single vertex for output based on the input domain location and other information. A geometry shader 108 receives an input primitive and outputs up to four primitives that are generated by the geometry shader 108 based on the input primitive. One stream of primitives is provided to a rasterizer 109 and up to four streams of primitives can be concatenated to buffers in the storage resources 101. The rasterizer 109 performs shading operations and other operations such as clipping, perspective dividing, scissoring, and viewport selection, and the like.

A pixel shader 110 inputs a pixel flow and outputs zero or another pixel flow in response to the input pixel flow. An output merger block 111 performs blend, depth, stencil, or other operations on pixels received from the pixel shader 110.

The first example of the graphics processing system includes a single graphics pipeline (i.e., graphics pipeline 100) that is implemented using a unified shader pool 104 that includes one or more SIMD compute processing cores for executing appropriate shader programs. For example, the vertex shader 103, the hull shader 105, the domain shader 107, the geometry shader 108, and the pixel shader 110 can be implemented using shader programs executing on the SIMD-type processing cores in the unified shader pool 104. Other elements of the graphics pipeline 100, such as the input assembler 102, the tessellator 106, the rasterizer 109, and the output merger block 111, are implemented using fixed-function hardware that is configured to perform a single function or set of functions. However, the number of stages (which are also referred to herein as "fragments") of the graphics pipeline 100 is static, which leads to some of the stages being redundant and unused by some applications. Furthermore, bottlenecks in the fixed-function hardware can reduce the overall throughput of the graphics pipeline 100 and leave a large proportion of the computational power of the unified shader pool 104 unused.

Figure 2:
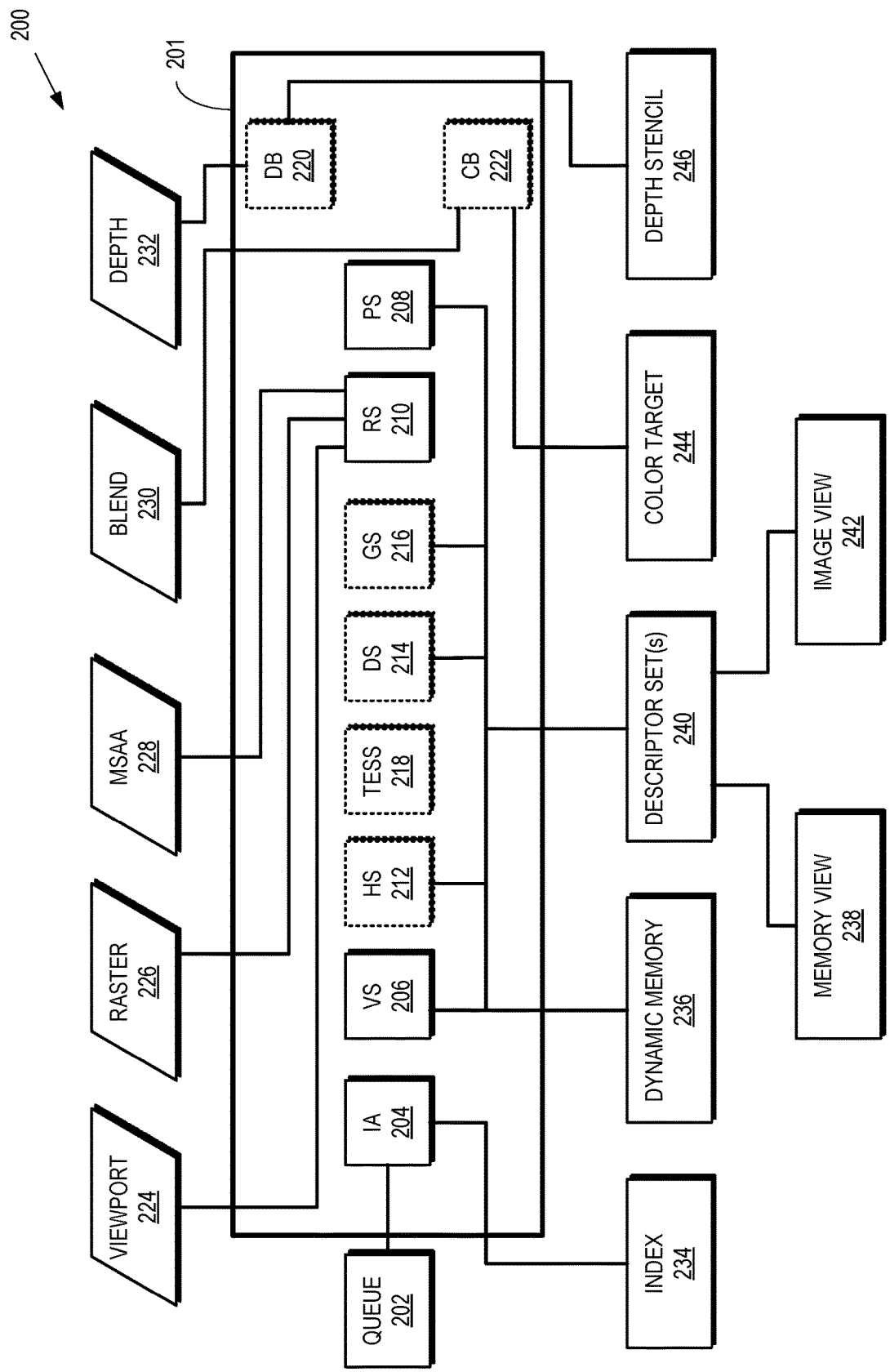
FIG. 2 is a block diagram of an example of graphics processing system that includes a configurable graphics pipeline according to some embodiments.

FIG. 2 is a block diagram of an example of graphics processing system 200 that includes a configurable graphics pipeline 201 according to some embodiments. The graphics processing system 200 can be implemented as part of a graphics processing unit (GPU) and software driver environment that accesses commands from a queue 202 that is configured to store one or more command buffers. The command buffers store rendering commands (e.g., Draw with geometry commands) or compute commands (e.g., shader code) that are targeted to one or more of the shader engines in the graphics pipeline 201. Command buffers are generated by driver software and added to the queue 202. When the graphics pipeline 201 is ready to process another command, and input assembler (IA) 204 pulls command buffers from the queue 202 and provides them to other shader engines in the graphics pipeline 201 for execution.

The configurable graphics pipeline 201 includes a set of required shader stages that include shader engines and fixed function hardware units. The required shader engines include a vertex shader (VS) 206 and a pixel shader (PS) 208. The required fixed function hardware units include the input assembler 204 and a rasterizer (RS) 210. The configurable graphics pipeline 201 also includes a set of optional shader stages that include shader engines and fixed function hardware units. The optional shader stages include a hull shader (HS) 212, a domain shader (DS) 214, and a graphics shader (GS) 216. The optional fixed function hardware units include a tessellator (TESS) 218, a depth stencil test and output unit (DB) 220, and a color blender and output unit (CB) 222. As discussed herein, the shader stages can be implemented using the resources of a unified shader pool. The functionality of the shader engines and fixed function hardware units in the configurable graphics pipeline 201 corresponds to the functionality of corresponding elements discussed herein, e.g., with regard to the graphics pipeline 100 shown in FIG. 1.

Operation of the fixed function hardware units in the graphics pipeline 201 is configured and controlled based on dynamic state information that is provided to the graphics pipeline 201 in conjunction with commands that are executed by the fixed function hardware units. In some embodiments, the dynamic state information includes viewport dynamic state information 224 that defines the viewport for the object or fragment that is being processed by the rasterizer 210, rasterizer dynamic state information 226 that defines the state of the rasterizer 210, multi-sample antialiasing (MSAA) dynamic state information 228 that defines the state of the rasterizer 210 to reduce aliasing, color blender dynamic state information 230 that defines the state of the color blender and output unit 222, and depth stencil dynamic state information 232 that defines the state of the depth stencil test and output unit 220. Index data 234 is provided to the input assembler 204 to identify the indices of the objects, primitives, or fragments that are processed by the graphics pipeline 201.

Operation of the shader engines is configured or controlled on the basis of dynamic memory views 236 that are accessible by the shader engines. The dynamic memory views 236 include primitive index data. A static memory view 238 is also accessible as part of a descriptor set 240. As used herein, the term "descriptor set" refers to a special state object that conceptually can be viewed as an array of shader resources, sampler object descriptors, or pointers to other descriptor sets. Some embodiments of the descriptor set 240 also include image views 242. One or more different descriptor sets are available to the graphics pipeline 201. Shader resources and samplers that are referenced in the descriptor sets 240 are shared by all the shader engines in the graphics pipeline 201. Color targets 244 for the object, primitive, or fragment are accessible by the color blender 222. Depth stencil targets 246 for the object, primitive, or fragment are accessible by the depth stencil test and output unit 220.

The graphics pipeline 201 is configurable using different combinations of the shader engines and fixed function hardware units. In some embodiments, the valid graphics pipelines can be built by following a set of rules such as: (1) a vertex shader 206 is required, (2) a pixel shader 208 is required for color output and blending but is optional for depth-only rendering, and (3) a hull shader 212 and a domain shader 214 are required to enable tessellation in graphics pipelines that include the tessellator 218. Various configurations of the graphics pipeline 201 can then be generated in different circumstances, as shown in Table 2. However, other configurations of the graphics pipeline 201 can be generated based on the above set of rules.

The graphics pipeline 201 is an example of a monolithic pipeline object that defines a large part of the state associated with a 3D pipeline using a single bind point. The state associated with the single bind point includes state information for all of the shader engines in the graphics pipeline 201, as well as fixed function states that impact shader execution in various configurations of the graphics pipeline 201. Implementing the graphics pipeline 201 as a monolithic pipeline object, allows a reduction in API overhead by enabling up-front shader optimization at compile time. Embodiments of the graphics pipeline 201 also make the CPU performance of the pipeline driver more predictable, since shader compilation is not kicked off by the driver at draw time outside of the application's control. The monolithic pipeline representation is bound to the state of the graphics pipeline 100 in command buffers.

TABLE 2

Examples of valid configurations of the graphics pipeline 201

| Pipeline configuration | Description |
| --- | --- |
| IA->VS->RS->DB | Depth-stencil only rendering pipeline. |
| IA->VS->RS->PS->DB | Depth/stencil only rendering pipeline with pixel shader (for example, using pixel shader for alpha test). |
| IA->VS->RS->PS->CB | Color only rendering pipeline. |
| IA->VS->RS->PS->DB->CB | Color and depth-stencil rendering pipeline. |
| IA->VS->GS->RS->PS->DB->CB | Rendering pipeline with geometry shader. |
| IA->VS->HS->TESS->DS->RS->PS->DB->CB | Rendering pipeline with tessellation. |
| IA->VS->HS->TESS->DS->GS->RS->PS->DB->CB | Rendering pipeline with tessellation and geometry shader. |

Although there are many advantages to implementing the graphics pipeline 201 as a monolithic pipeline, the graphics pipeline 201 cannot be reconfigured to support processing by the shader engines or the fixed function hardware units in different orders. Only valid configurations that conform to the above set of rules (such as the example shown in Table 2) can be used for graphics and other data type processing in the graphics pipeline 201.

Figure 3:
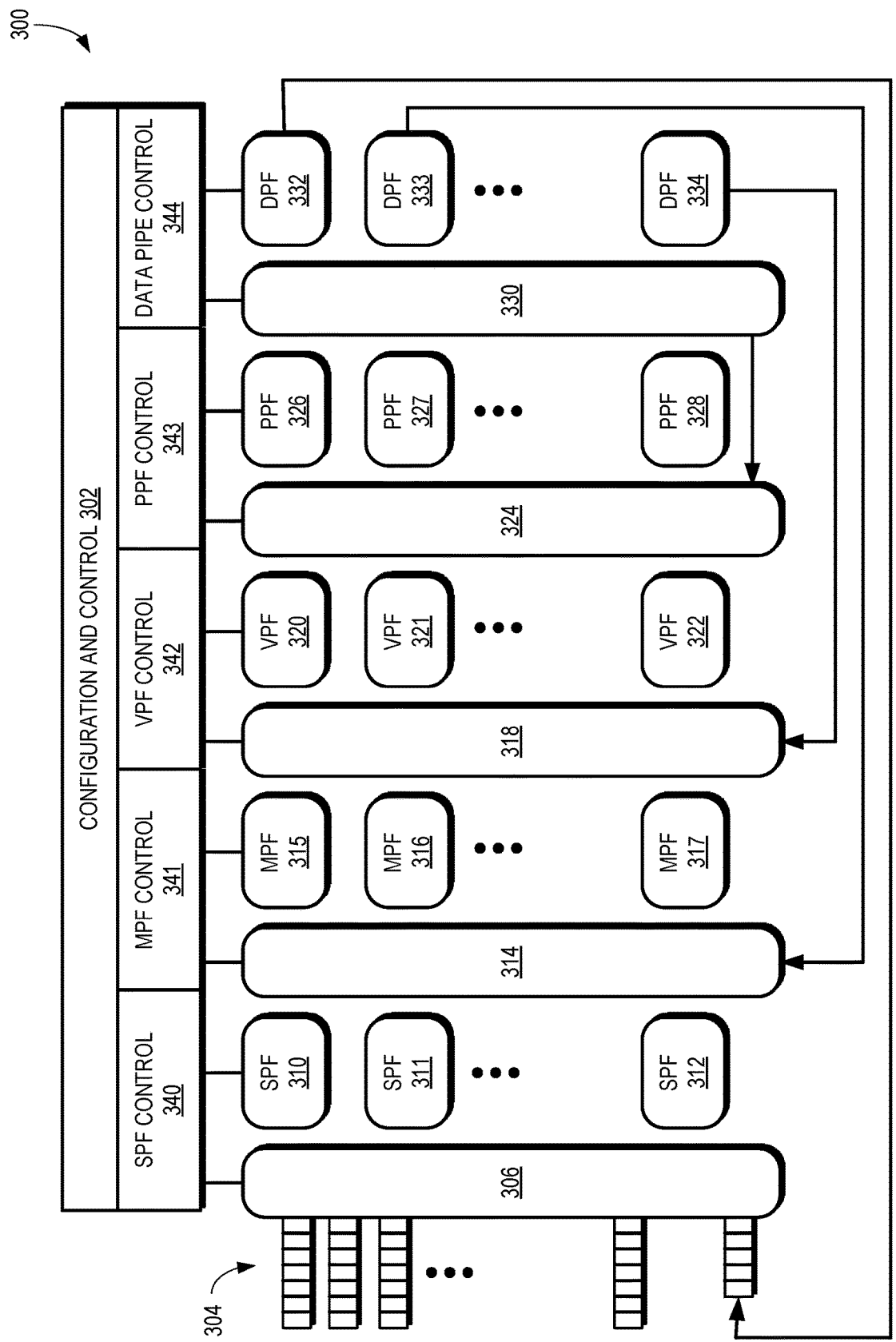
FIG. 3 is a block diagram of a graphics processing system that supports reconfigurable virtual graphics pipelines according to some embodiments.

FIG. 3 is a block diagram of a graphics processing system 300 that supports reconfigurable virtual graphics pipelines according to some embodiments. The reconfigurable graphics processing system 300 is implemented using one or more graphics and general compute processing cores that can be used to support a plurality of unified shader engines, programmable RISC micro-engines, one or more fixed function hardware units, memory elements that are used to store data or instructions, and other hardware circuitry, as discussed herein. Although some embodiments of the reconfigurable graphics processing system 300 are utilized to perform graphics processing (e.g., using configurable virtual graphics pipelines), the virtual graphics pipelines in the graphics processing system 300 can also be used for general purpose calculations, image processing with involved dedicated fixed function units implementing FFT, convolution, and other specific functions. For example, virtual graphics pipelines can be configured to support deep learning neural networks that are implemented on a GPU platform.

The reconfigurable graphics processing system 300 includes a configuration and control block 302 that supports management, control, arbitration, and synchronization of multiple reconfigurable virtual graphics pipelines. The configuration and control block 302 receives system input or user input that is used to configure the virtual graphics pipelines. Configuring the virtual graphics pipelines can include resource allocation or mapping of resources to the virtual pipelines in fully static, semi-static, semi-dynamic, and fully dynamic modes. For example, the configuration and control block 302 can dynamically configure or reconfigure the virtual graphics pipelines in response to system events or user input indicating that a new virtual graphics pipeline is to be instantiated, an existing virtual graphics pipeline is to be reconfigured, or an existing virtual graphics pipeline is to be removed or terminated, e.g., due to completion of the thread that was being executed by the existing virtual graphics pipeline.

A set of queues 304 include commands that are to be executed by one of the virtual graphics pipelines. Some embodiments of the queues 304 are implemented as ring buffers in a memory. Each of the queues 304 is able to be in an "active" state or an "on hold" state depending on application activity that writes the data to a tail of the queue 304. The application is also able to send doorbell signals with head and tail pointer values to context status descriptor registers or memory locations. The number of virtual graphics pipeline that can be supported by the graphics processing system 300 is determined by the maximum number of supported context descriptor sets. In some embodiments, the reconfigurable graphics processing system 300 implements a reconfigurable structure that supports mapping a flexible number of context descriptor sets into a memory hierarchy.

A routing, queuing, and mapping (RQM) element 306 receives commands from the set of queues 304. The RQM element 306 is configured to map the queues 304 to different virtual graphics pipelines. The RQM element 306 can then queue commands from the queues 304 for the corresponding virtual graphics pipelines. The commands are routed by the RQM element 306 to the virtual graphics pipelines for execution. In the illustrated embodiment, the RQM element 306 provides the commands to one or more super pipe fragments (SPF) 310, 311, 312, which are collectively referred to herein as "the SPFs 310-312." Each of the SPFs 310-312 is part of a different virtual graphics pipeline and each of the SPFs 310-312 processes commands for the corresponding virtual graphics pipeline in accordance with descriptors in a descriptor set associated with the commands. Some embodiments of the SPFs 310-312 are described in more detail below.

An RQM element 314 receives commands from the SPFs 310-312. The RQM element 314 is configured to map the SPFs 310-312 to meta-pipe fragments (MPFs) 315, 316, 317 that are part of the same virtual graphics pipeline as one of the corresponding SPFs 310-312. For example, commands received from the SPF 310 can be mapped to the MPF 315. The RQM element 314 can then queue commands from the SPFs 310-312 for the MPFs 315-317 in the corresponding virtual graphics pipelines. The commands are then routed by the RQM element 314 to the corresponding MPFs 315-317 for execution. The MPFs 315-317 could be implemented using RISC micro-engines for executing metacommand resolution and processing threads. Some embodiments of the MPFs 315-317 are described in more detail below.

An RQM element 318 receives commands from the MPFs 315-317. The RQM element 318 is configured to map the MPFs 310-312 to corresponding virtual pipe fragments (VPFs) 320, 321, 322 that are part of the same virtual graphics pipeline as one of the corresponding MPFs 315-317. As a result of processing in MPFs 315-317, the meta-command flow is converted to command/data flow that can be properly interpreted by following VPFs 320-322. For example, command and data flow received from the MPF 315 can be mapped to the VPF 320. The RQM element 318 can then queue commands and data from the MPFs 315-317 for the VPFs 320-322 in the corresponding virtual graphics pipelines. The commands and data are then routed by the RQM element 318 to the corresponding VPFs 320-322 for execution. The VPFs 320-322 process commands and data in conjunction with corresponding physical pipe fragments (PPFs) 326, 327, 328. Some embodiments of the VPFs 320-322 are described in more detail below.

An RQM element 324 receives commands and data from the VPFs 320-322. The RQM element 324 is configured to map the VPFs 320-322 to the corresponding PPF 326-328 that are part of the same virtual graphics pipeline as one of the corresponding VPFs 320-322. For example, commands and data received from the VPF 320 can be mapped to the PPF 326. The PPFs 326-328 implement fixed function hardware and/or perform compute data processing in allocated resources of a unified shader pool. Some embodiments of the PPFs 326-328 are described in more detail below. The RQM element 324 can then queue commands from the VPFs 320-322 for the PPFs 326-328 in the corresponding virtual graphics pipelines. The commands and data are then routed by the RQM element 324 to the corresponding PPFs 326-328 for execution.

An RQM element 330 receives commands from the PPFs 326-328. The RQM element 330 is configured to map the PPFs 326-328 to corresponding data pipe fragments (DPFs) 332, 333, 334 to support the physical processing functions in the virtual graphics pipeline. For example, commands and data received from the PPF 326 can be mapped to the DPF 332. The RQM element 330 can then queue commands and data from the PPFs 326-328 for the DPFs 332-334 in the corresponding virtual graphics pipelines. The commands and data are then routed by the RQM element 330 to the corresponding DPFs 332-334 for execution. The DPFs 332-334 perform multiple types of operations on data including packet generation and data re-arrangement. Some embodiments of the DPFs 332-334 are described in more detail below. Packets, rearranged data, or other feedback can be provided from the RQM element 330 or the DPFs 332-334 to the set of queues 304, the RQM element 314, the RQM element 318, or the RQM element 324.

Stages of the virtual graphics pipelines are configured and operated under the control of corresponding control elements 340, 341, 342, 343, 344, which are collectively referred to herein as "the control elements 340-344." Each of the control elements 340-344 can receive data or instructions from the configuration and control unit 302. The control elements 340-344 are also configured to provide configuration and control signaling to their corresponding stages of the virtual graphics pipelines. For example, the control element 340 can provide configuration and control signaling to the RQM element 306 and the SPFs 310-312.

The control element 340 performs queue status monitoring configuration and provides configuration signaling to the RQM element 306 or the SPFs 310-312 to support interaction between multiple parallel running applications that are concurrently updating their context status descriptors. In some embodiments, each potential active application is associated with its own descriptor set. The control element 340 can then allocate a set of registers to store a context queue status for each active application which can be monitored by dedicated hardware. The allocated registers can be stored in dedicated memory blocks or shared buffers that are mapped to a memory space.

The control element 341 performs configuration of the command packet resolution functionality and controls command packet (metacommand) resolution for the MPF stage. The control element 341 operates on active queues detected at the previous SPF stage. In some embodiments, one or more VPFs 320-322 can be created and associated with one or more of the MPFs 315-317, perhaps in combination with dedicated hardware blocks or selected threads (micro-threads) that are implemented on one or more of the RISC micro-engine MPFs 315-317. As used herein, the phrase "micro-engine VPF" refers to pipeline fragments that are established using a micro-engine as a base for the portion of the virtual graphics pipeline. RISC micro-engine VPFs are able to fetch and decode queue entries and associated DMA buffers to create the tasks for on-chip processing in the virtual graphics pipelines.

The control element 342 performs configuration and control of the processing front-end. Some embodiments of the control element 342 distribute the tasks prepared on previous MPF stage to allocated resources of the graphics processing system 300. The control element 342 is also able to schedule the tasks for execution on processing VPFs 320-322 or PPFs 326-328. Front-end VPFs implementing such functionality can be implemented on different platforms depending on minimal latency requirements. RISC micro-engine VPFs can be used in case of high latency tolerance and hardware-based state machines in the case of low latency tolerance.

The control element 343 performs configuration and control for processing VPFs 320-322 or PPFs 326-328. For example, the control element 343 can define configuration of all computing VPFs 320-322 contained in multiple virtual pipes pipelines as well as their internal connectivity with different type of resources. Computing VPFs 320-322 can be configured to contain PPFs 326-328 implemented as programmable shader kernels or fixed function hardware computation blocks or combination of both.

The control element 344 performs configuration and control of the data output stages, e.g., the DPFs 332-334. Some embodiments of the control element 344 define one or more types of data output that can be exported to following VPFs 320-322 via internal routing, queueing, and mapping (e.g., the RQM elements 314, 318, 324) or to external queues such as the set of queues 304. The control element 344 in combination with other control elements 340-343 is also able to create virtual graphics pipelines of any shape and complexity to match application requirements, as discussed herein.

Figure 4:
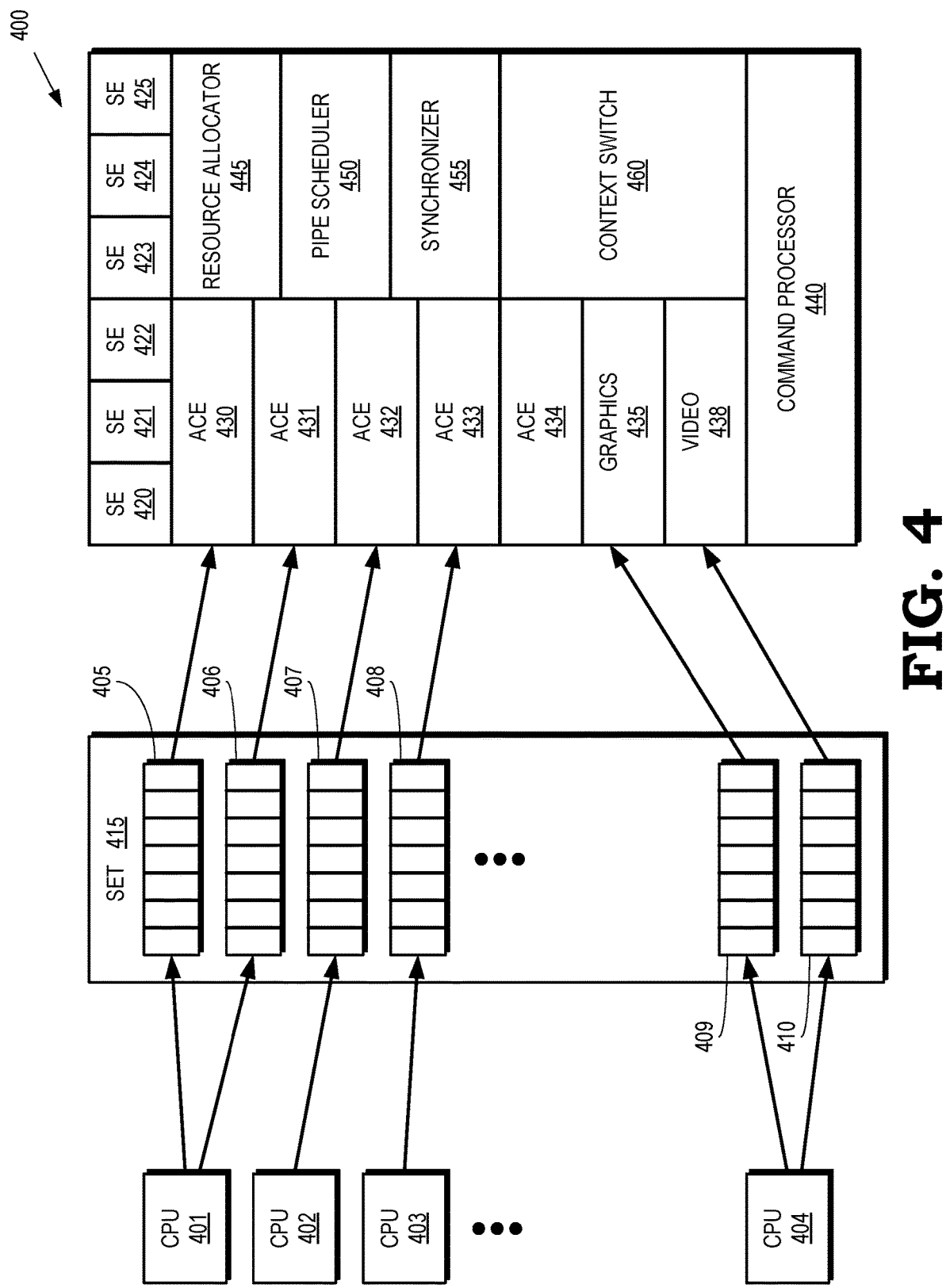
FIG. 4 is a block diagram of a graphics processing system that implements multiple queues that provide commands to multiple graphics pipelines according to some embodiments.

FIG. 4 is a block diagram of a graphics and compute processing system 400 that implements multiple queues that provide commands and data to multiple graphics pipelines according to some embodiments. The graphics processing system 400 includes multiple CPU-type processor cores 401, 402, 403, 404 (collectively referred to herein as "the CPU cores 401-404") that generate commands and data for execution by one or more graphics pipelines. Some embodiments of the CPU cores 401-404 are multithreaded processor cores that are implemented as part of a central processing unit (CPU). The CPU cores 401-404 provide the commands and data to queues 405, 406, 407, 408, 409, 410 (collectively referred to herein as "the queues 405-410") that are part of a set 415. The queues 405-410 include entries that store commands and data or associated contexts that are used to configure the graphics processing system 400 to process the commands.

One or more shader engines (SE) 420, 421, 422, 423, 424, 425 (collectively referred to herein as "the shader engines 420-425") are implemented using shared hardware resources of the graphics processing system 400. Some embodiments of the shader engines 420-425 can be used to implement shaders in the graphics processing system 300 shown in FIG. 3. The shared hardware resources include asynchronous compute engines (ACE) 430, 431, 432, 433, 434 (collectively referred to herein as "the asynchronous compute engines 430-434") for executing general compute metacommands, a graphics processing engine 435 configured to execute graphics metacommands, and a video processing engine 438 configured to execute video metacommands. The asynchronous compute engines 430-434 are distinct functional hardware blocks that are capable of executing general compute metacommands concurrently with other asynchronous compute engines 430-434.

A command processor 440 fetches metacommands from the queues 405-410 and routes the metacommands to the appropriate shared hardware resources. For example, the command processor 440 can fetch commands from the queue 405 and route the commands to the asynchronous compute engine 430. The command processor 440 can also be used to map the queues 405-410 to the corresponding shared hardware resources. For example, the command processor 440 can map the queue 409 to the graphics engine 435 and subsequently route metacommands from the queue 409 to the graphics engine 435 based on the mapping. A resource allocator 445 is used to allocate shared resources to the shader engines 420-425 to implement the graphics pipelines, a pipe scheduler 450 is used to schedule commands for execution by the shared resources that are used to implement the graphics pipelines, a synchronizer 455 is used to synchronize execution of metacommands by the graphics pipelines, and a context switch module 460 is configured to perform context switching to allow the graphics pipelines to operate on different threads of commands using different states that are specified by the different contexts. The context switch module 460 also supports preemption of threads that are executing on the graphics pipelines for different clients providing shared GPU resource mode.

Figure 5:
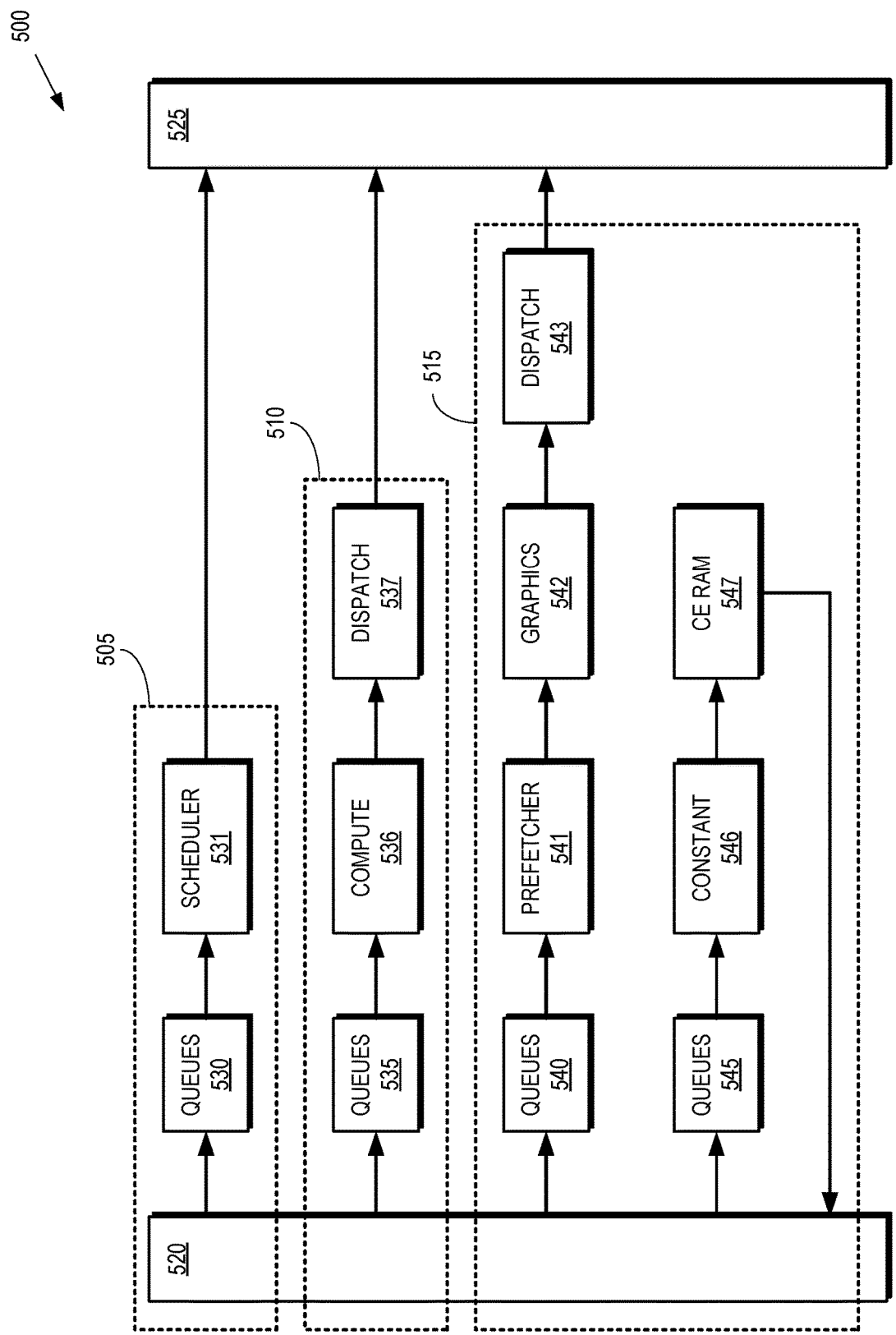
FIG. 5 is a block diagram of a command processor that is configured to fetch commands from one or more application queues according to some embodiments.

FIG. 5 is a block diagram of a command processor 500 that is configured to fetch commands from one or more application queues according to some embodiments. The command processor 500 is implemented using fixed function hardware blocks and RISC micro-engine cores. The command processor 500 also includes firmware to fetch commands from command buffers, allocate resources, and perform graphics pipeline and compute pipeline scheduling and synchronization. The command processor 500 is subdivided into three portions: (1) a graphics engine 505, (2) an asynchronous compute engine 510, and (3) a scheduling engine 515. A cache interface 520 provides an interface to one or more caches or a cache hierarchy that caches metacommands or state information used to define the contexts of the metacommands. The shader interface 525 provides an interface to one or more shader engines, which are implemented using shared resources of a unified shader pool. The shader interface 525 can provide support for allocating tasks to the different shader engines.

The scheduling engine 505 includes a queue block 530 that provides queues, buffers, and other hardware. For example, the queue block 530 can include a primary queue (PQ), a heterogeneous system architecture (HSA) Interface Queue (IQ), one or more Indirect Buffers (IB), and End-Of-Pipe (EOP) hardware support. The queue block 530 also supports command buffers and data fetch from memory hierarchy via the cache interface 520. The scheduling engine 505 also includes a scheduler 531. Some embodiments of the scheduler 531 perform scheduling of commands stored in a command buffer for subsequent execution. The scheduled commands can then be provided to the shader interface 525. Scheduling of the commands for execution can be performed by firmware running on a hardware RISC microengine that is used to implement the scheduler 531

The asynchronous compute engine 510 includes a queue block 535 to provide queues, buffers, and other hardware such as a primary queue, and HSA interface queue, indirect buffers, or EOP (end of packet) hardware support. The asynchronous compute engine 510 also includes a compute engine 536 that can perform processing of metacommands received from the queue block 535. A dispatch controller 537 propagates command task execution to shader processor input and task allocation (via the shader interface 525) for further execution. For example, the dispatch controller 537 can dispatch commands to shader pool resources for execution as part of a set of connected threads (or waves) that use the same program counter value (e.g., using single program multiple data, SPMD, techniques). In some cases, multiple asynchronous compute engines can be implemented as multiple firmware threads running on one or more microengines.

The graphics engine 515 includes a queue block 540 to provide queues, buffers, and other hardware. The queue block 540 is configured to store commands or context information requested by a prefetch parsing block 541 that is configured to prefetch the commands, data or context information from the caches via the cache interface 520. The graphics engine 515 also includes a RISC micro-engine 542 that can perform metacommand and data processing using commands or data that are prefetched from the queue block 541 and a dispatch controller 543 that propagates command task execution to shader processor input and task allocation via the shader interface 525. The graphics engine 515 includes another queue block 545 that stores commands or context information for execution by a constant engine 546, which can be implemented as a RISC micro-engine. The constant engine 546 is coupled to a memory such as a random access memory (RAM) 547, which is dedicated to support graphics constant management. Commands or context information stored in the RAM 547 can be accessed via the cache interface 520.

Figure 6:
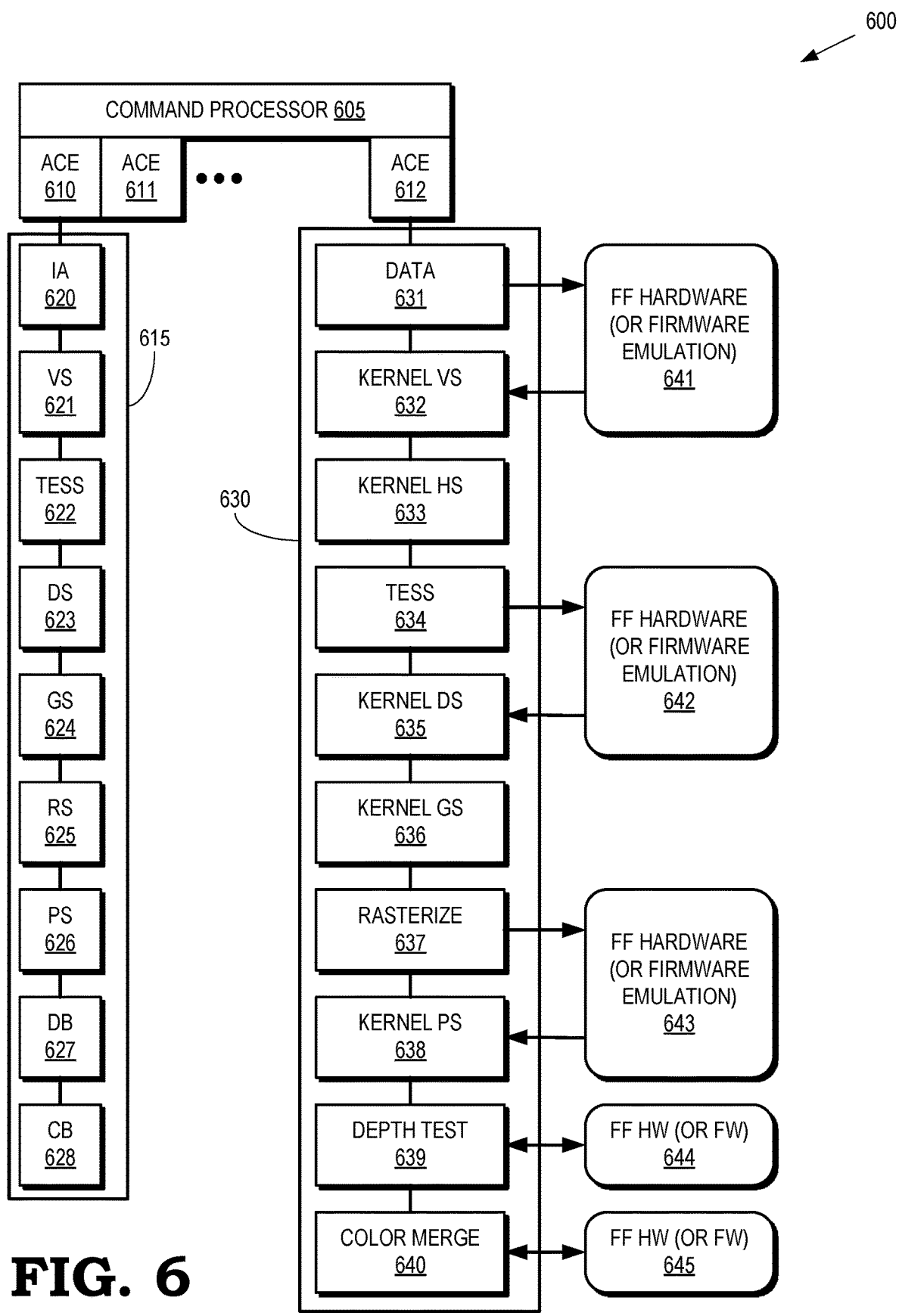
FIG. 6 is a block diagram of a graphics processing system that supports multiple reconfigurable virtual graphics pipelines according to some embodiments.

FIG. 6 is a block diagram of a graphics processing system 600 that supports multiple reconfigurable virtual graphics pipelines (or virtual GPUs) according to some embodiments. The graphics processing system 600 includes a command processor 605 (such as the command processor 500 shown in FIG. 5) that is configured to route, queue, or map commands associated with different threads to corresponding asynchronous compute engines 610, 611, 612, which are collectively referred to herein as "the asynchronous compute engines 610-612". Each of the asynchronous compute engines 610-612 is able to support a different virtual graphics pipeline and the virtual graphics pipelines concurrently execute commands in different threads generated by different applications without context switching or preemption. This feature provides seamless virtualization of GPU for multiple clients. The virtual graphics pipeline can be tailored to requirements of the different applications, e.g., by an application developer, and multiple instantiations of virtual graphics pipelines coexist on the physical resources of a graphics processing system. Thus, the graphics processing system 600 can host multiple virtual graphics pipelines with different pipeline shapes on shared hardware or firmware resources of the graphics processing system. The graphics processing system 600 also provides better memory access locality by reducing the size of tasks to small batches or objects that can be distributed among the multiple virtual graphics pipelines with manageable level of internal memory footprint.

The graphics processing system 600 includes a first virtual graphics pipeline 615 that is supported by the asynchronous compute engine 610 and a second virtual graphics pipeline 630 that is supported by the asynchronous compute engine 612. The first virtual graphics pipeline 615 includes an input assembler 620, a vertex shader 621, a tessellator 622, a domain shader 623, a geometry shader 624, a rasterizer 625, a pixel shader 626, a depth stencil test unit 627, and a color blender and output unit 628. The second virtual graphics pipeline 630 shows a closer view of the virtual pipeline implementation as a multistage shader software stack and includes a data assembler 631, a vertex shader kernel 632, a hull shader kernel 633, a tessellator 634, a domain shader kernel 635, a geometry shader kernel 636, a rasterizer 637, a pixel shader kernel 638, a depth stencil test block 639, and a color merge block 640. Although not shown in FIG. 6, some embodiments of the graphics processing system 600 also include additional virtual graphics pipelines that can be supported by the asynchronous compute engines similar to 610-612.

To support implementations of a reconfigurable GPU, the graphics processing system 600 also includes shared fixed function hardware blocks 641, 642, 643, 644, 645, which are collectively referred to herein as "the shared fixed function hardware blocks 641-645." Some embodiments of the shared fixed function hardware blocks 641-645 are used as common shared resources with arbitrated access so that any kernel in a software stage of the virtual graphics pipelines 615, 630 is able to request a dedicated fixed function hardware block to execute a particular function and return the resulting data to the requesting software stage. For example, the data assembler 631 can transmit a request (or call) to the dedicated fixed function hardware block 641 to perform an operation and the results of the operation can be returned to the vertex shader kernel 632. For another example, the tessellator 634 can transmit a request to the dedicated fixed function hardware block 642 to perform an operation and the results of the operation can be returned to the kernel domain shader 635. In the interest of clarity, requests and responses transmitted by stages of the virtual graphics pipeline 615 are not shown in FIG. 6. Moreover, the fixed function hardware blocks 641-645 (and their association with stages of the virtual graphics pipeline 630) are intended to be illustrative. Other stages in the virtual graphics pipeline 615, 630 can request access to, and receive responses from. more or fewer fixed function hardware blocks.

The fixed function hardware blocks 641-645 can be emulated using corresponding shader firmware. For example, emulations of the fixed function hardware blocks 641-645 can be instantiated in shader firmware in response to detecting bottlenecks in the fixed function hardware blocks 641-645. The shader firmware emulations of the fixed function hardware blocks 641-645 can then be used to perform the requested operations instead of using the actual hardware, thereby alleviating the bottlenecks in the fixed function hardware blocks 641-645.

Some embodiments of the graphics processing system 600 have a number of advantages over conventional graphics pipelines. For example, the graphics processing system 600 utilizes fixed-function hardware within the compute domain and many compute shaders or virtual GPUs can be scheduled concurrently and load balanced by the asynchronous compute engines 610-612, perhaps in combination with software supported by an HSA (Heterogeneous System Architecture) stack. Multiple virtual graphics pipelines are also able to perform millions of small scene texture-space renders per second and process a number of small command buffers created by multithreaded parallel applications running on power multicore CPU platforms. The graphics processing system 600 is also able to remove front-end bottlenecks on context switch and preemption, minimize data movement by enabling persistent producer-consumer threads, and maintain the option to keep code and data local to a compute unit and iterate as well as use a local on-chip memory hierarchy such as a cache hierarchy, ring buffers, or other parts of the memory hierarchy to stream data to or from the fixed function hardware blocks 641-645. The need to flush caches to communicate between GPU-local processes can also be avoided.

Figure 7:
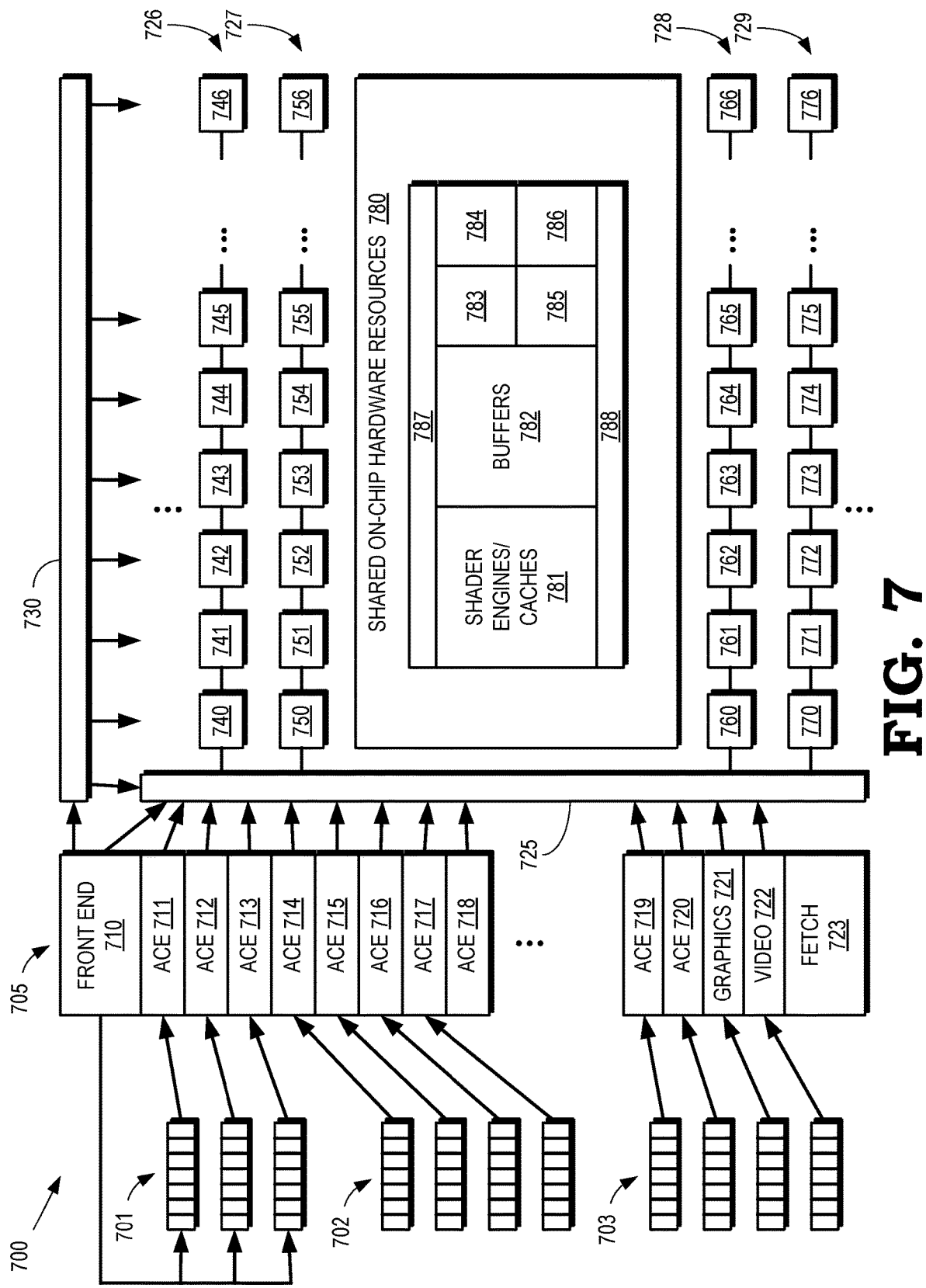
FIG. 7 is a block diagram of a graphics processing system including multiple reconfigurable virtual graphics pipelines according to some embodiments.

FIG. 7 is a block diagram of a graphics processing system 700 including multiple reconfigurable virtual graphics pipelines according to some embodiments. The graphics processing system 700 is used to implement some embodiments of the graphics processing system 300 shown in FIG. 3, the graphics processing system 400 shown in FIG. 4, or the graphics processing system 600 shown in FIG. 6.

The graphics processing system 700 includes feedback queues 701 that receives commands or context information that is fed back from other portions of the graphics processing system 700, as discussed herein. Some embodiments of the feedback queues 701 are defined by the virtual graphics pipelines that create data queues or buffers for processing by other virtual graphics pipelines. The graphics processing system 700 also includes user-defined queues 702 for receiving commands or context information, e.g., the queues 702 can be created by users via an HSA software stack. The graphics processing system 700 also includes application/context queues 703 that receives commands or context information associated with concurrent application tasks, scene decomposition, application programming interfaces (APIs), or device drivers. The application/context queues 703 hold tasks defined by multithreading system software.

The graphics processing system 700 implements a shared command processor resource pool 705 that is used in some embodiments of the command processor 440 shown in FIG. 4, the command processor 500 shown in FIG. 5, or the command processor 605 shown in FIG. 6. The shared command processor resource pool 705 supports a front-end 710 that is configured to perform resource allocation, scheduling, and task synchronization for the tasks being performed by the graphics processing system 700. The shared command processor resource pool 705 also supports asynchronous compute engines 711, 712, 713, 714, 715, 716, 717, 718, 719, 720 (collectively referred to herein as "the asynchronous compute engines 711-720"), a graphics engine 721, a video engine 722, and a fetch engine 723 that is configured to fetch data or commands from the queues 701-703 and buffers with commands and data that are indicated by the pointers.

The shared command processor resource pool 705 is connected to an allocation block 725 that is configured to allocate an array of shader kernels to one or more virtual graphics pipelines 726, 727, 728, 729, which are collectively referred to herein as "the virtual graphics pipelines 726-729." The shared command processor resource pool 705 is also connected to a set 730 of state management registers, buses, and state machines. For example, the front-end 710 can provide context information associated with the commands via buses in the set 730 to configure the registers or state machines in the set 730 to determine an operational state of one or more of the virtual graphics pipelines 726-729. The buses in the set 730 are also able to convey information between the registers or state machines in the set 730 and the virtual graphics pipelines 726-729.

The asynchronous compute engines 711-720 are configured to pull data or commands from the queues 701-703 and create tasks that are provided to the virtual graphics pipelines 726-729. In conjunction with allocation of the tasks to the virtual graphics pipeline 726-729, the front-end 710 provides the pipeline state data to the set 730 for distribution to the corresponding virtual graphics pipeline 726-729. Distribution of the state data is performed synchronously with allocation of the tasks to the virtual graphics pipelines 726-729 so that the operational states of the virtual graphics pipelines 726-729 are consistent with the tasks that are to be performed.

The virtual graphics pipelines 726-729 are reconfigurable and user-definable and each of the virtual graphics pipelines 726-729 can be formed of a different combination of shader engines, fixed function hardware, or firmware emulations of the fixed-function hardware. For example, the virtual graphics pipeline 726 can include a first shader kernel 740, a fixed function hardware call/return block 741, a second shader kernel 742, a second fixed function hardware call/return block 743, a third shader kernel 744, a third fixed function hardware call/return block 745, a fourth shader kernel 746, as well as other shader engines, fixed function hardware, or firmware emulations that form the set 740-746. The virtual graphics pipeline 727 is formed of a set 750-756 of shader engines, fixed function hardware, or firmware emulations, the virtual graphics pipeline 728 is formed of a set 760-766 of shader engines, fixed function hardware, or firmware emulations, and the virtual graphics pipeline 729 is formed of a set 770-776 of shader engines, fixed function hardware, or firmware emulations. Some embodiments of the graphics processing system 700 include more or fewer virtual graphics pipelines than the four virtual graphics pipelines 726-729 shown in FIG. 7 and the number of virtual graphics pipelines (as well as the composition of the virtual graphics pipelines) can change dynamically, e.g., in response to user input or system events such as completion of the tasks in a thread assigned to a virtual graphics pipeline.

The virtual graphics pipeline 726-729 are implemented using shared on-chip hardware resources 780. The resources 780 include a set 781 of shader engines and corresponding caches. The shader engines are implemented using one or graphics processing cores. The caches can include a memory hierarchy that is formed of L1 caches, L2 caches, L3 caches, and the like. The number of levels in the memory hierarchy can be larger or smaller than the three levels used to implement the L1 caches, L2 caches, and L3 caches. Some embodiments of the memory hierarchy include DRAM, registers, queues, buffers, and the like. The resources 780 also include a set 782 of specialized memory buffers and first-in-first-out (FIFO) buffers that provide buffering of data during interactions between the shader engines and fixed function hardware units 783, 784, 785, 786, which are collectively referred to herein as "the fixed function hardware units 783-786." Access to the shared on-chip hardware resources is controlled by blocks 787, 786 perform access arbitration, scheduling, and queuing of tasks such as commands that are to be executed by the shader engines in the set 781 or the fixed function hardware units 783-786.

Figure 8:
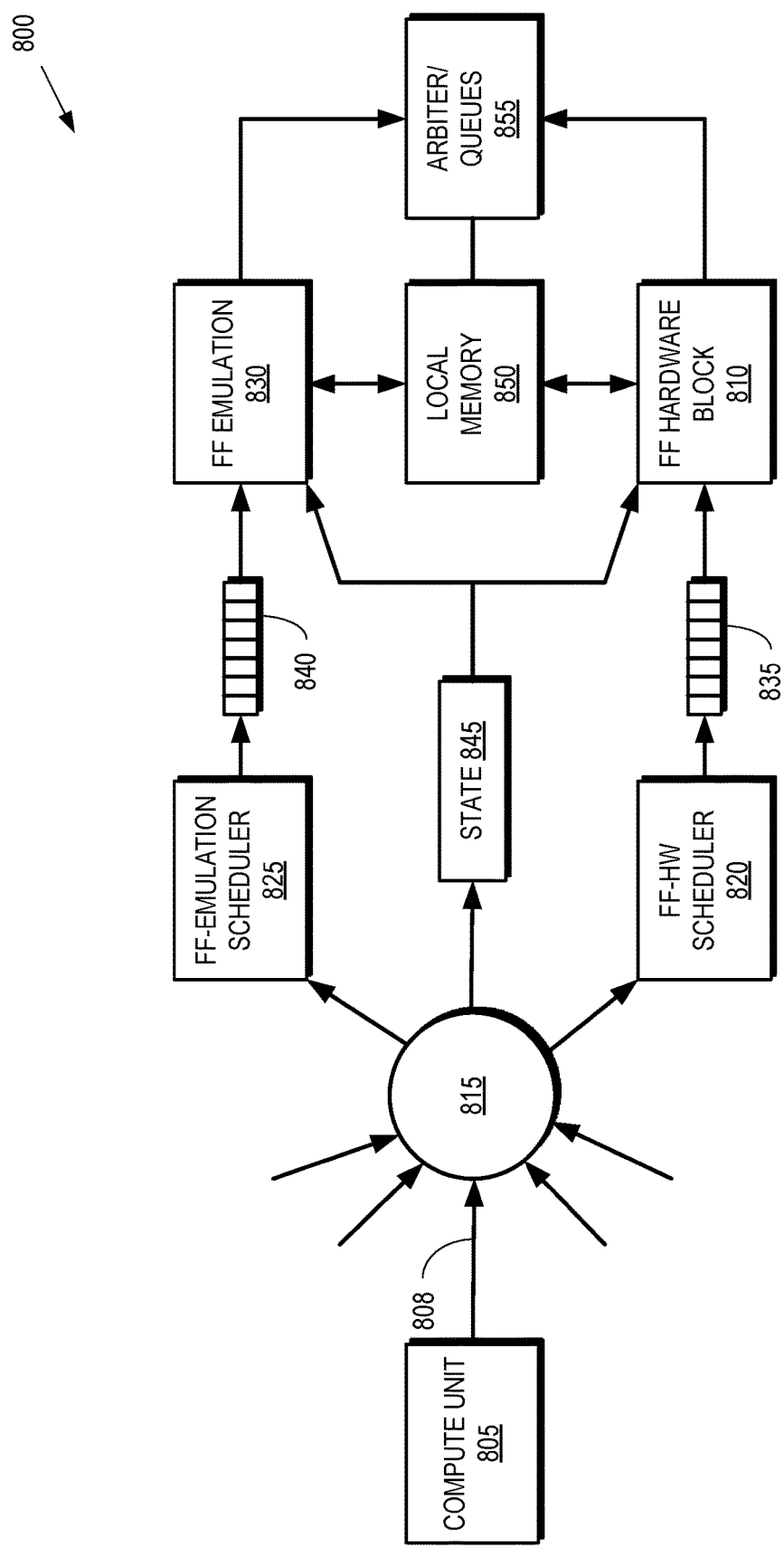
FIG. 8 is a block diagram of a component of a graphics processing system illustrating interaction of compute units with fixed function hardware according to some embodiments.

FIG. 8 is a block diagram of a graphics processing system 800 illustrating interaction of compute units with shared fixed function hardware according to some embodiments. The graphics processing system 800 includes one or more compute units 805 (only one shown in the interest of clarity) that are part of a shared resource pool that is used to execute shader kernels (programs).

The shader kernel executing on the compute unit 805 issues a call 808 to a fixed function hardware block 810. The call 808 is received at an arbiter 815 that performs access arbitration between the call 808 and other calls that are received from other shader kernels. The arbiter 815 is able to provide the call 808 to a fixed function hardware scheduler 820 that schedules tasks for execution by the fixed function hardware block 810 or a fixed function emulations scheduler 825 that schedules tasks for execution by a shader firmware emulation 830 of the fixed function hardware block 810. The arbiter 815 chooses between the schedulers 820, 825 based on the operational status of the fixed function hardware block 810. If the block 810 is busy, e.g., if a buffer or queue 835 that holds tasks that are scheduled for the fixed function hardware block 810 is full, the arbiter 815 directs the call 808 to the emulation scheduler 825, which can schedule the call 808 and provide the call 808 to a queue 840. If the block 810 is not busy, e.g., if the queue 835 is not full, the arbiter 815 directs the call 808 to the fixed function hardware scheduler 820.

The arbiter 815 also provides virtual pipeline state information 845 to the fixed function hardware block 810 or the emulation 830. The state information 845 is provided in a manner that is synchronous with the call 808 so that the state information 845 can be used to define the appropriate state of the fixed function hardware block 810 or the emulation 830 when it is performing the operation requested by the call 808. In some cases, different virtual pipelines maintain different sets of state data packages to configure the operational states of the fixed function hardware block 810 or the emulation 830. The state information 845 can be provided via pointers to memory locations and actual data retrieval might take several clock cycles. Pointer resolution can be performed or conducted while the call 808 is waiting in the firmware queue 840.

The fixed function hardware block 810 and the shader firmware emulation kernels 830 are both able to access a shared local memory 850. The shared local memory 850 includes a memory hierarchy that can be used to implement shared registers, buffers, and a cache hierarchy including L1 caches, L2 caches, and the like. Access arbitration for the shared local memory 850 is performed using an arbiter 855 that can include one or more queues to facilitate the arbitration process. In some cases, the fixed function hardware block 810 retrieves data from shader export registers implemented in the memory 850 and returns results directly to shared memory buffers or shader register file portions that are allocated in the local memory 850 for use by the shader kernel executing on the compute unit 805. In some cases, results generated by the fixed function hardware block 810 have variable or unpredictable sizes. This type of result can be written to ring buffers allocated in cache and memory hierarchy of the shared local memory 850 by passing a pointer to the caller shader kernel.

Some embodiments of the firmware emulation 830 perform single-instruction-multiple-data (SIMD) wave rearrangement if data is not immediately available in the registers, caches, or buffers of the shared local memory when the firmware emulation 830 is ready to execute a requested operation. If data is available immediately in the shared local memory 850, then the call 808 is provided directly to the emulation 834 execution. If input data is not available immediately or needs SIMD wave data rearrangement, then the call 808 is queued and the kernel thread/wave goes to a thread execution queue (which can be implemented in the shared local memory 850) in a manner that is similar to a cache miss event and data retrieval from DRAM memory. Some embodiments of the emulation 830 call an export shader type of kernel to perform data rearrangement in conjunction with the emulation 830.

Figure 9:
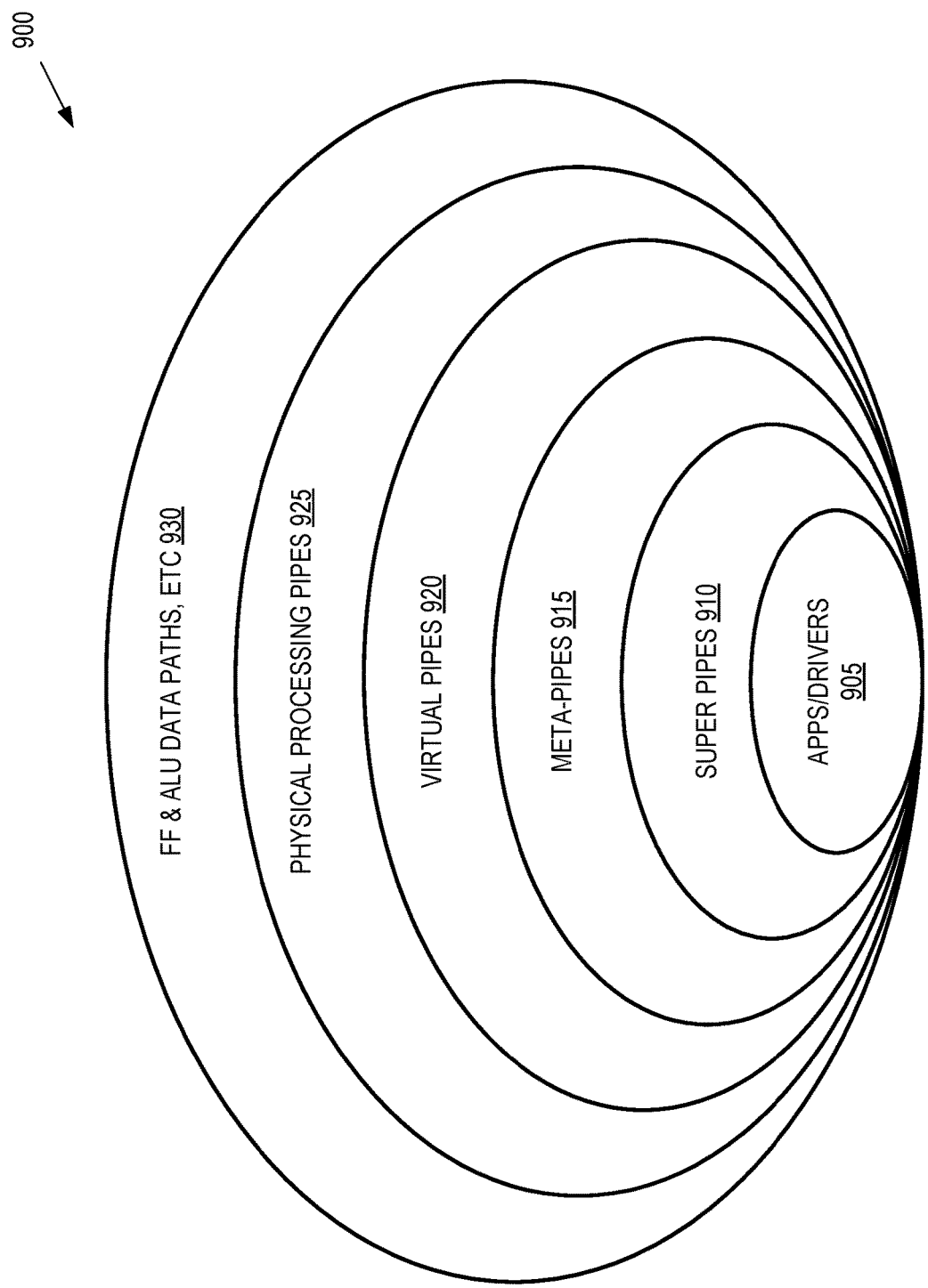
FIG. 9 is a diagram illustrating a functional hierarchy and control domains for reconfigurable virtual graphics pipelines according to some embodiments.

FIG. 9 is a diagram 900 illustrating a functional hierarchy and control domains for reconfigurable virtual graphics pipeline according to some embodiments. The diagram 900 illustrates the functional hierarchy and control domains that are implemented in some embodiments of the graphics processing system 300 shown in FIG. 3, the graphics processing system 400 shown in FIG. 4, the graphics processing system 600 shown in FIG. 6, and the graphics processing system 700 shown in FIG. 7.

The application/driver level 905 includes one or more user applications and supporting user mode drivers (UMD) and low level drivers (LLD) that are configured to populate and manage multiple queues or ring buffers in system memory. User software or API software implemented at the application/driver level 905 can manage queues in the memory. Some embodiments of the queues are configured for promotion to graphics processing system context queues by mapping the queue into a GPU queue status descriptor domain, which can be monitored and controlled by hardware or firmware implemented in a super pipe domain 910.

The super pipe domain 910 supports queue status monitoring, as well as queue activation and synchronization between applications based on their priority and detected activity information. The super pipe domain 910 supports instantiation of one or more super pipe fragments such as the super pipe fragments 310-312 shown in FIG. 3. Some embodiments of a front-end of a command processor (such as the front-end 710 shown in FIG. 7) are implemented in the super pipe domain 910. The front-end can be implemented on a RISC micro-engine in combination with dedicated fixed function hardware blocks. Some embodiments of the front-end implemented in the super pipe domain 910 are configured to manage the activity of a meta-pipe domain 915. Some embodiments of the front-end are also able to execute multiple concurrent threads to make multiple GPU devices visible to one or more applications.

The meta-pipe domain 915 provides active queue data processing with packet fetch, decode, and execution dispatch. The meta-pipe domain 915 also supports retrieval of associated data from a memory hierarchy. The meta-pipe domain 915 supports instantiation of meta-pipe fragments such as the meta-pipe fragments 315-317 shown in FIG. 3. The meta-pipe domain 915 can support allocation of multiple meta-pipes for active GPU contexts. The meta-pipes can be executed concurrently to process command packets (metacommands) and perform related data acquisition for virtual pipes that are defined in the virtual pipe domain 920. The meta-pipe domain 915 also provides synchronization and arbitration based on explicit codes in command packets (metacommands). Some embodiments of the meta-pipe domain 915 are implemented as a core part of a command processor in conjunction with firmware or software running on one or more RISC micro-engines in conjunction with dedicated fixed function hardware blocks. Some embodiments of the meta-pipe domain 915 are also configured to manage the activity of the virtual pipe domain 920. One or more parallel threads can be executed concurrently in the RISC micro-engines running meta-pipe software to serve multiple independent command packet queues or virtual pipes in the virtual pipe domain 920.

The virtual pipe domain 920 provides mapping and chaining of virtual graphics or compute pipelines to shared resources necessary for processing context information in associated queues. The virtual pipe domain 920 supports instantiation of virtual pipe fragments (VPF) such as the virtual pipe fragments 320-322 shown in FIG. 3. Virtual pipe fragments can be mapped to particular physical processing fragments (PPF) and a shared memory hierarchy. Multiple virtual pipe fragments can be concurrently instantiated, arranged, and interconnected to process one or more metacommands in parallel based on a data flow that is fetched from one or more active context queues via meta-pipes. The virtual pipe domain 920 is functionally equivalent to task pipelining and monitors the status of engaged virtual pipeline fragments that are being executed on dedicated graphics processing resources. Some embodiments of the virtual pipe domain 920 can be implemented as a back-end part of a command processor including firmware or software executing on one or more RISC micro-engines in conjunction with one or dedicated fixed function hardware blocks. The virtual pipe domain 920 is able to configure virtual pipeline fragments to create different pipeline shapes and manage the activity of preconfigured virtual pipeline fragments with appropriate dispatch and synchronization between virtual pipeline fragments. The virtual pipe domain 920 can also be implemented as multiple concurrent threads in each RISC micro-engine running virtual pipe software to serve multiple virtual pipes and monitor underlying activity in a physical processing domain 925.

The physical processing domain 925 contains shared resource pools or clusters of fixed function hardware-based physical processing pipe fragments or physical processing pipe fragments that are implemented using a unified shader resource pool or fixed function hardware cluster. The physical processing domain 925 supports instantiation of the physical processing pipe fragments 326-328 shown in FIG. 3. The virtual pipe fragment configuration and control blocks, as well as block/memory mapping and routing circuitry, can be considered as a resource pool to use by multiple virtual pipes. The physical processing domain 925 can be implemented using a combination fixed function hardware, RISC micro-engine firmware threads, or shader kernels combined with appropriate buffers and interfaces.

The outermost domain 930 represents hardware circuit resources that are configured to perform data processing and implement data migration pipes. Some embodiments of the data processing and migration pipes are used to implement data paths for fixed function hardware programmable arithmetic logic units (ALUs). The outermost domain 930 also includes hardware circuit resources that include control and arbitration circuitry, interfaces, and data fabrics with predetermined functionality and timing.

Figure 10:
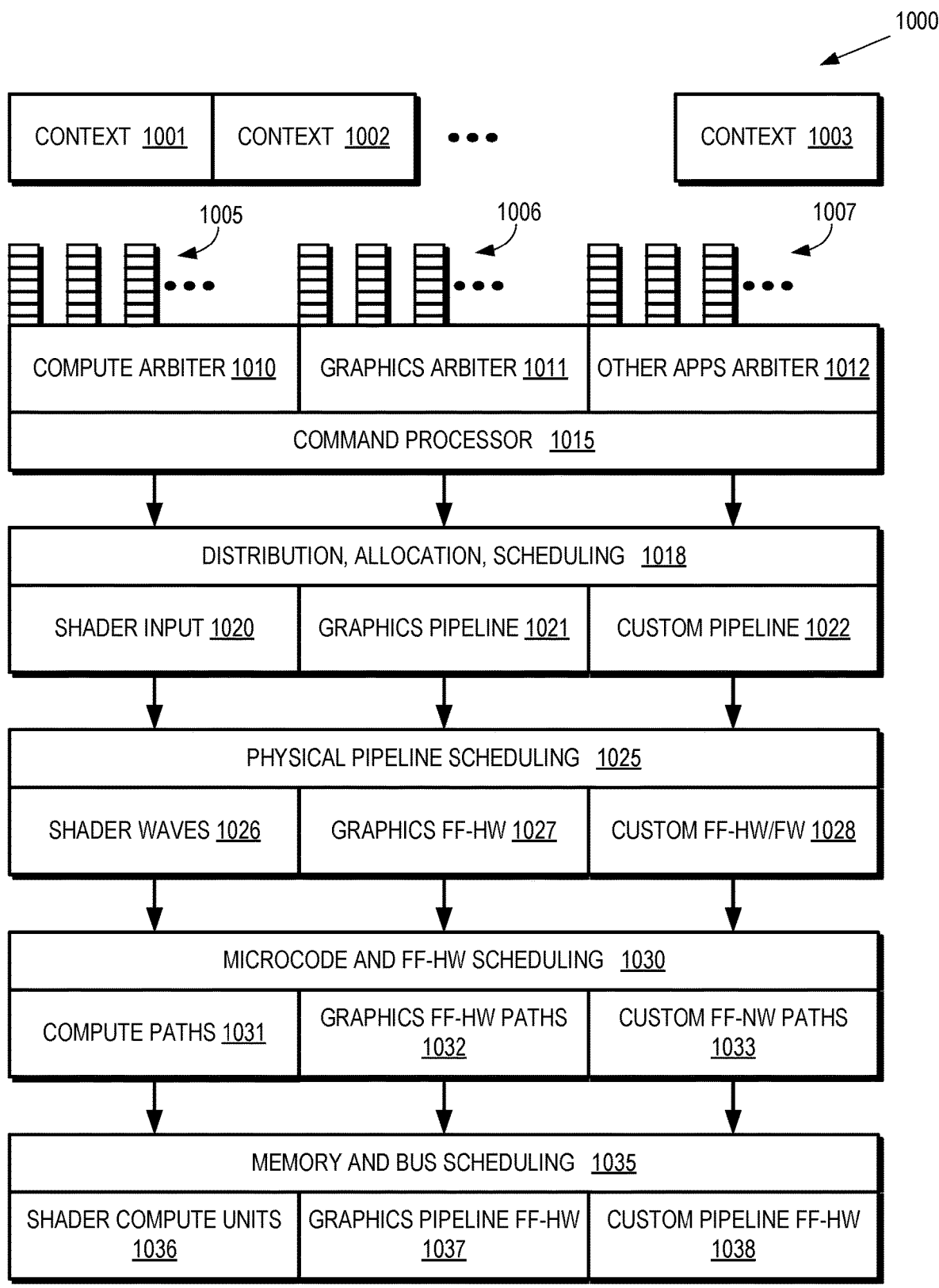
FIG. 10 is a block diagram illustrating a hierarchy for context management, task queueing, dispatch, and scheduling in domains of a graphics processing system according to some embodiments.

FIG. 10 is a block diagram illustrating a hierarchy 1000 for context management, task queueing, dispatch, and scheduling in domains of a reconfigurable graphics processing system according to some embodiments. The hierarchy 1000 is implemented in accordance with some embodiments of the functional hierarchy and control domains shown in FIG. 9.

One or more application contexts 1001, 1002, 1003 (collectively referred to herein as "the contexts 1001-1003") are executing on one or more graphics processing cores or compute units in an OS/application/driver domain such as the domain 905 shown in FIG. 9. The OS/application/driver domain operates with millisecond delays considering low reactivity of the corresponding software stack. Application context management with scheduling, synchronization is usually implemented by using special OS utilities and application program components. The contexts 1001-1003 provide commands to corresponding queues 1005, 1006, 1007, which are implemented in a low level driver domain. The low level driver domain works with hundreds of microseconds delay and manages all GPU queues 1005-1007 and ring buffers creating command packet flows based on API user mode driver requests and other requests. GPU resources are not involved in this domain. The queues 1005 include HSA and other format queues, the queues 1006 include draw command queues, and the queues 1007 include video, image, and other commands.

A compute arbiter 1010 is used to monitor descriptor sets and arbitrate between the commands in the queues 1005. A graphics arbiter 1011 is used to monitor and arbitrate between commands in the queues 1006. An "other apps" arbiter 1012 is used to monitor and arbitrate between commands in the queues 1007. The arbiters 1010-1012 are implemented in a super pipe domain such as the super pipe domain 910 shown in FIG. 9. Queue status monitoring in the super pipe domain as a latency of 100 s-1000 s clock cycles and manages the reaction of GPU front end to message signaling and doorbell interrupts coming from multiple running application contexts to GPU. The super pipe domain initiates command processor to start activity with one of the queues 1005-1007 in response to "doorbell" type of notification from application that activates the use of the queue.

A command processor 1015 is implemented in a meta-pipe domain such as the meta-pipe domain 915 shown in FIG. 9. The meta-pipe domain operates with a latency of 100 s-1000 s clock cycles for queuing, arbitration and synchronization in metacommand/command packet processing and resolution. Programmable RISC-type microengines supported by some HW blocks can be used for queue processing, synchronization and data fetch arrangements. The command processor 1015 is a multichannel command processor that includes programmable RISC micro-engines that can be combined with one or more fixed function hardware blocks. The command processor 1015 is configured for processing, synchronization, and dispatch of queued or buffered packets (metacommands).

A distribution, allocation, and scheduling block 1018 is implemented in a virtual pipe domain such as the virtual pipe domain 920 shown in FIG. 9. The virtual pipe domain operates with delays of 10-20 s clock cycles for queuing, arbitration and synchronization. Some embodiments of the virtual pipe domain use dedicated hardware or microcode controllers depending on the timing requirement. The block 1018 distributes, allocates, and schedules tasks to a shader input 1020, a graphics pipeline 1021, or a custom pipeline 1022 that are implemented in the virtual pipe domain.

A physical pipeline scheduling block 1025 is implemented in a physical processing pipe domain such as the physical processing pipe domain 925 shown in FIG. 9. The physical processing pipe domain operates with delays of between two clock cycles and tens of clock cycles and uses special hardwired state machines and sequencers to provide arbitrated and synchronized access to programmable data path and fixed function hardware resources. The block 1025 performs scheduling an excuse arbitration for the physical pipeline fragments in the physical pipe domain. The block 1025 can provide tasks or commands to a shader engine that generates shader waves 1026, data paths for the graphics fixed function hardware 1027, or custom pipelines for fixed function hardware or firmware emulations 1028.

A microcode and fixed function hardware scheduling block 1030 is implemented in a data processing pipe domain such as the domain 930 shown in FIG. 9. The data processing pipe domain operates with delays of 1-3 clock cycles. Some embodiments of the data processing pipe domain are therefore implemented hardware to perform queuing, arbitration and synchronization via dedicated state machines. A compiler can be used to help synchronize compute data path operations and avoid data hazards. The block 1030 performs arbitration and scheduling of commands or tasks for compute data paths 1031, graphics fixed function hardware data paths 1032, or custom fixed function hardware or firmware emulations data paths 1033, which are also implemented in the data processing pipe domain.

A memory and bus scheduling block 1035 is implemented in a data migration pipe domain that can be included in some embodiments of the domain 930 shown in FIG. 9. The data migration pipe domain operates with delays of between two clock cycles and tens of clock cycles and uses special hardwired controllers to perform queuing, arbitration and synchronization of access to memory and I/O resources/busses. The block 1035 is configured to perform access arbitration and scheduling of access to memory or input/output buses. The arbitration and scheduling is performed for shader engine compute units 1036, graphics pipeline fixed function hardware units 1037, or custom pipeline fixed function hardware or firmware emulation units 1038.

Figure 11:
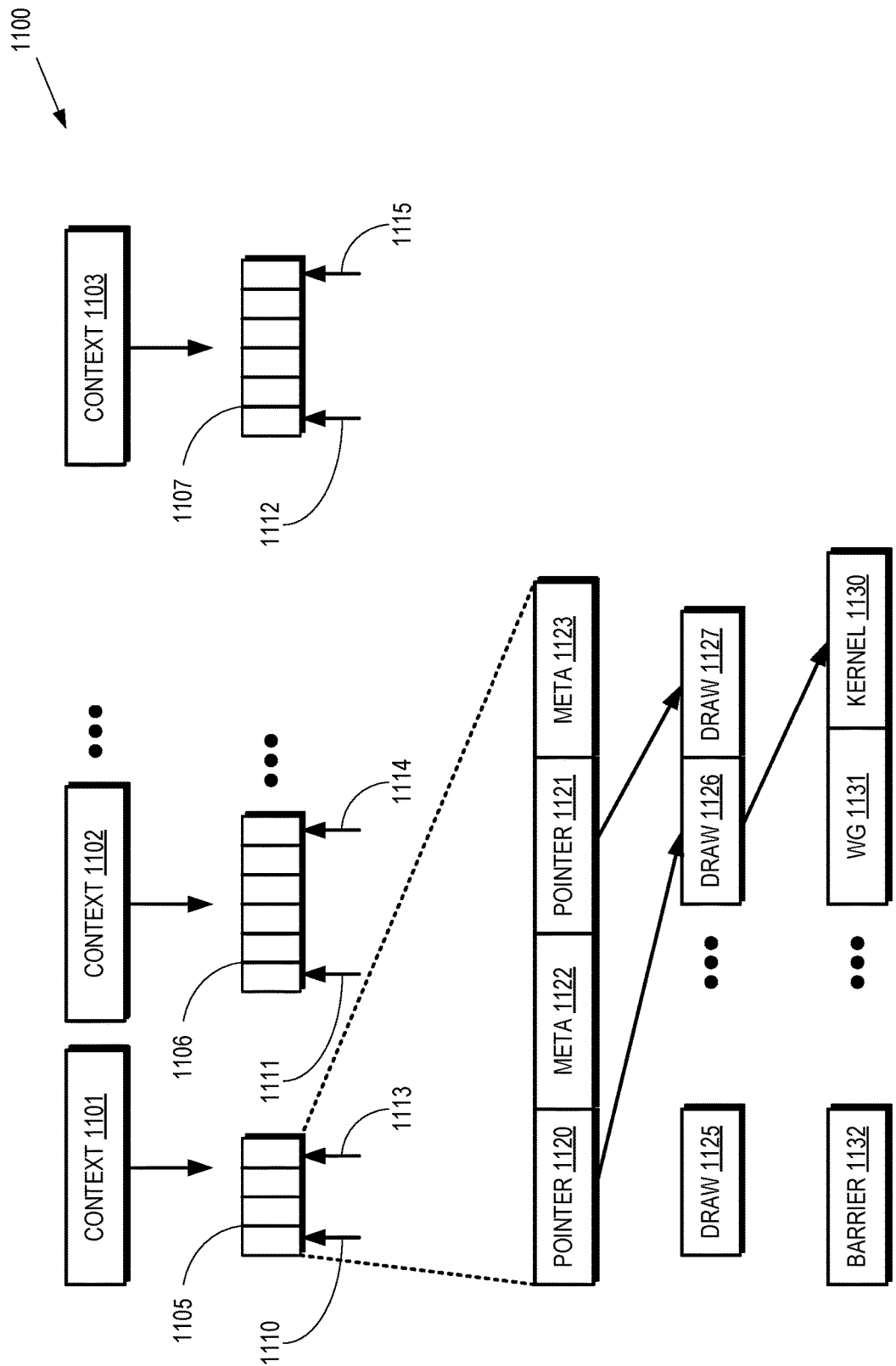
FIG. 11 is a block diagram illustrating a set of contexts that are used by applications to generate packets for execution according to some embodiments.

FIG. 11 is a block diagram illustrating a set 1100 of contexts that are used by applications to generate packets for execution according to some embodiments. The contexts 1101, 1102, 1103 (collectively referred to herein as "the contexts 1101-1103") are created by applications that are executing in graphics processing systems including some embodiments of the graphics processing system 300 shown in FIG. 3, the graphics processing system 400 shown in FIG. 4, the graphics processing system 600 shown in FIG. 6, and the graphics processing system 700 shown in FIG. 7.

The contexts 1101-1103 create corresponding queues 1105, 1106, 1107, which are collectively referred to herein as "the queues 1105-1107." The queues 1105-1107 are implemented as memory ring buffers that are specified by head pointers 1110, 1111, 1112 that point to the head of the corresponding queues 1105-1107 and tail pointers 1113, 1114, 1115 that point to the tail of the corresponding queues 1105-1107. For example, the context 1101 can create the queue 1105 for storing elements such as pointers 1120, 1121 and meta-commands 1122, 1123. Processing elements can read entries in the queues 1105-1107 from the slots indicated by the head pointers 1110-1112 and the application can fill the queues 1105-1107 by adding entries at the position indicated by the tail pointers 1113-1115. Some embodiments of the pointers are direct memory access (DMA) memory pointers that indicate locations in the memory hierarchy or a DMA buffer. Some embodiments of the metacommands are command packets that include attached DMA buffer pointers. Draw commands 1125, 1126, 1127 in the command packets contain state or primitive geometry information, vertex information, and the like. Compute commands can include kernel code 1130 or a reference to code, workgroup arguments 1131, barriers 1132, and the like. The queues 1105-1107 can be monitored in response to processing requests or status changes.

Some embodiments of the queues 1105-1107 are managed by an application/driver domain and lowest level driver (LLD) domain functionality. For example, application or driver software can allocate memory for the queues 1105-1107 and create a Unified Queue Descriptor (UQD) to retain queue information. The software can then register the queues 1105-1107 with LLD for processing on the hardware, store handles and doorbell address return from LLD to update the hardware write (tail) pointers 1113-1115, and enter data in the queues 1105-1107 with flow control base on the queue owner's read (head) pointers 1110-1112. If one of the queues 1105-1107 is filled, the application waits for hardware to drain it or move the data to a bigger queue. The application software can also set up pipeline state based on desired type of processing and perform queue coordination on the pipeline or across the pipelines.

The LLD Driver software is configured to perform queue registration and tracking, allocate memory for Queue Run List (QRL), allocate memory for a descriptor, and create a MQD (Memory Queue Descriptor) and initialize queue data. When finished, the LLD driver software can send a request to the queue to de-queue and clean up. The LLD driver software can also perform queue scheduling including assigning queues to Hardware Queue Descriptors (HQD) for hardware processing, setting up doorbell addresses and performing handshaking to establish a good initial write pointer. The LLD driver software can also program an HQD and then assign the HQD for hardware processing, as well as setting up and maintaining pipeline priorities, establishing virtualization methods for the queues 1105-1107, and the like.

Figure 12:
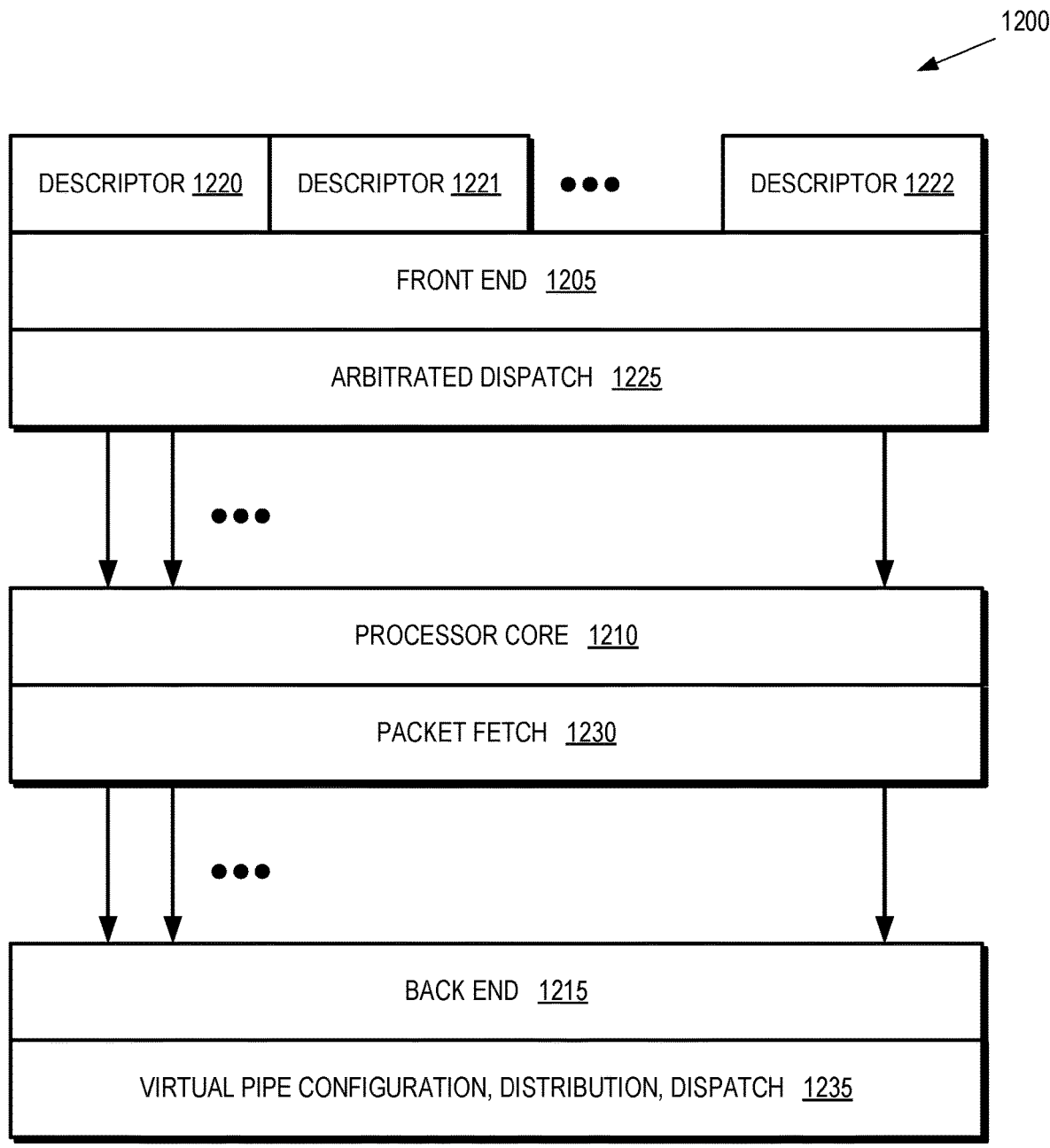
FIG. 12 is a block diagram of a command processor for reconfigurable virtual graphics pipelines according to some embodiments.

FIG. 12 is a block diagram of a command processor 1200 for reconfigurable graphics pipelines according to some embodiments. The command processor 1200 is implemented in some embodiments of the command processor 440 shown in FIG. 4, the command processor 500 shown in FIG. 5, the command processor 605 shown in FIG. 6, or the command processor 1015 shown in FIG. 10. The command processor 1200 includes a front-end 1205 that supports a super pipe domain, a processor core 1210 that supports a meta-pipe domain, and a backend 1215 that supports a virtual pipe domain.

The front-end 1205 accesses one or more descriptor sets 1220, 1221, 1222 that are collectively referred to herein as "the descriptor sets 1220-1222." The descriptor sets 1220-1222 are assigned to different applications and originate processing for different instances of virtual graphics pipelines. Some embodiments of the front-end 1205 are implemented using parallel hardware and firmware components that monitor and arbitrate multiple input queues via interaction with multiple sets of queue/context status descriptors (or registers) in the descriptor sets 1220-1222. The status of any queue can be updated by the applications and confirmed using special message signaling or doorbells which could be detected by command processor 1200 using monitoring hardware in the front-end 1205. An arbitrated dispatch block 1225 is used to dispatch commands to the processor core 1210. For example, the arbitrated dispatch block 1225 can dispatch active queue processing requests after detecting multiple active queue processing requests and performing arbitrations on the multiple active queue processing requests.

The processing core 1210 is associated with a packet fetch block 1230, which can be implemented using one or more parallel micro-engines that can execute multiple concurrent threads to provide fetching and decoding of command packets from application/agent queues and respective DMA buffers. Some embodiments of the processing core 1210 provide synchronizations via barriers and semaphores between multiple command streams before pushing the command packets to the back-end 1215 for execution dispatch. In some embodiments, the synchronization primitives are encoded in respective command packets such as kernel barriers. The processing core 1210 routes one or more streams of command packets to appropriate virtual pipes in the back-end 1215.

The backend 1215 is configured to arrange one or more streams of command packets and associated data for dispatch and execution in one or more virtual graphics pipelines that are implemented using preconfigured virtual pipe fragments that are mapped to the resources of one or more physical processing fragments. In some embodiments, a virtual pipe configuration, distribution, and dispatch block 1235 is used to configure the corresponding virtual pipes and then distribute commands to the configured virtual pipes.

Figure 13:
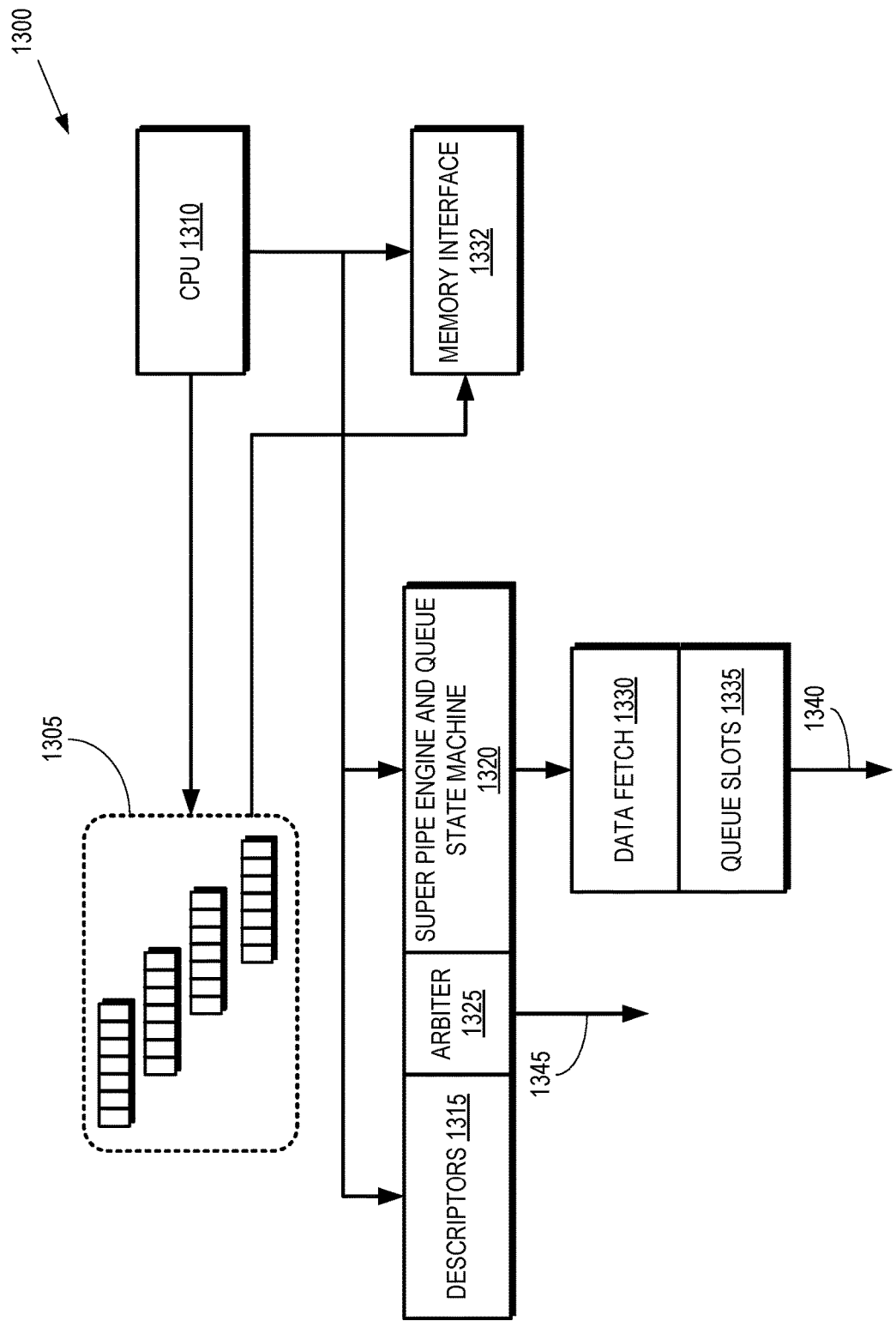
FIG. 13 is a block diagram of a super pipe fragment according to some embodiments.

FIG. 13 is a block diagram of a super pipe fragment 1300 according to some embodiments. The super pipe fragment 1300 is implemented in a super pipe domain such as the super pipe domain 910 shown in FIG. 9 and is used to implement some embodiments of the super pipe fragments 310-312 shown in FIG. 3. The super pipe fragment 1300 operates as a front-end of a corresponding virtual graphics pipeline and provides interaction between the allocated resources of the virtual graphics pipeline and one or more application threads that are assigned to the virtual graphics pipeline. Some embodiments of the super pipe fragment 1300 are implemented on an application level and operate within the super pipe domain 910 shown in FIG. 9.

The super pipe fragment 1300 includes a set 1305 of queues or ring buffers that include slots that can be filled by tasks or commands generated by application threads running on one or more processor cores, e.g., processor cores implemented in a CPU 1310. Some embodiments of the application threads running on the processor cores are supported by OS/LLD drivers, as discussed herein. Some or all of the queues in the set 1305 are mapped to descriptors 1315, such as GPU queue descriptors. The queues in the set 1305 are monitored by a shared super pipe engine and queue state machine 1320, which is implemented in hardware or firmware. Access to the descriptors 1315 can be arbitrated by an arbiter 1325. Threads generated by the CPU 1310 can activate the queues in the set 1305 by changing a status of one of the descriptors 1315 that is a queue descriptor for the corresponding queue. The super pipe engine 1320 can initiate a data fetch 1330 from queues in the set 1305 via a memory interface 1332. The super pipe engine 1320 then places the fetched queue slots 1335 in a special buffer for further processing by a meta-pipe fragment (not shown in FIG. 13), as indicated by the arrow 1340. Some embodiments of the arbiter 1325 generate inter-queue synchronization signals, tokens, or semaphores to manage processing of the fetched queue slots 1335 by the meta-pipe fragment, as indicated by the arrow 1345.

Figure 14:
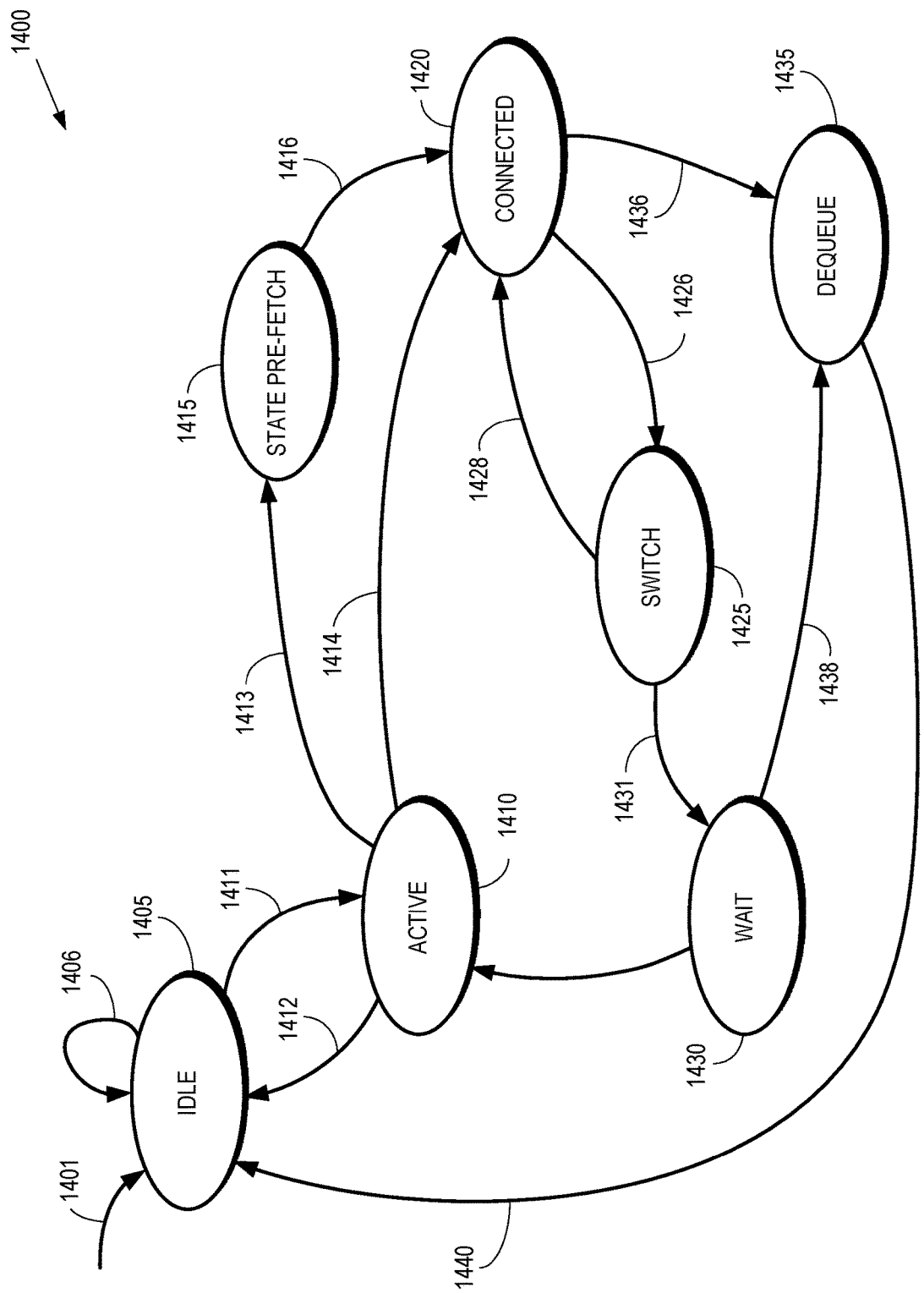
FIG. 14 is a block diagram of a state machine that is implemented in a super pipe fragment according to some embodiments.

FIG. 14 is a block diagram of a state machine 1400 that is implemented in a super pipe fragment according to some embodiments. The state machine 1400 is used to implement some embodiments of the queue state machine 1320 shown in FIG. 13.

In response to powering on or a reset command 1401, the state machine 1400 is placed in an idle state 1405 and waits for a corresponding queue or ring buffer (such as the queues or ring buffers in the set 1305 shown in FIG. 13) to become active. As long as the ring buffer is not active, the state machine 1400 remains in the idle state 1405, as indicated by the arrow 1406.

The state machine 1400 transitions from the idle state 1405 to the active state 1410 in response to detecting activation of the ring buffer, as indicated by the arrow 1411. The state machine 1400 can request access to the virtual graphics pipeline if the queue is not empty when the state machine 1400 is in the active state 1410. The state machine 1400 transitions back to the idle state 1405 in response to the ring buffer becoming inactive, as indicated by the arrow 1412. The state machine 1400 transitions from the active state 1410 to a pre-fetch state 1415, as indicated by the arrow 1413, if the ring buffer has previously been connected to the virtual graphics pipeline. Otherwise, the state machine 1400 transitions directly from the active state 1410 to a connected state 1420, as indicated by the arrow 1414. In the pre-fetch state 1415, the state machine 1400 reestablishes a persistent state associated with the previous connection before initiating processing of the commands from the ring buffer. The state machine 1400 then transitions from the pre-fetch state 1415 to the connected state 1420, as indicated by the arrow 1416.

In the connected state 1420, the state machine 1400 instructs a fetcher such as the packet fetch block 1230 shown in FIG. 12 to retrieve entries from the ring buffer and use them to populate a queue that provides tasks or commands to a subsequent meta-pipe fragment in the virtual graphics pipeline, as discussed herein. The state machine 1400 can transition from the connected state 1420 to a switch state 1425 if it is necessary to rewind the state for synchronization or indirection, as indicated by the arrow 1426. While in the switch state 1425, the state machine 1400 can handle indirection with continue or wait actions. The state machine 1400 can transition back to the connected state 1420, as indicated by the arrow 1428, or the state machine 1400 can transition to a waiting state 1430 (as indicated by the arrow 1431) if a wait action or a semaphore is generated. In the waiting state 1430, the state machine 1400 waits for a predetermined time or services semaphores that are used for synchronization.

The state machine 1400 is also able to transition from the connected state 1420 or the waiting state 1430 to a de-queue state 1435. The state machine 1400 transitions from the connected state 1420 to the de-queue state 1435 (as indicated by the arrow 1436) in response to determining that the ring buffer is empty and the queue for the meta-pipe fragment is also empty. The state machine 1400 can also evaluate whether it has reached an end of a time slice or a packet boundary, whether the ring buffer or queue has been removed by OS/LLD functionality, or whether the corresponding application has been terminated. The state machine 1400 transitions from the connected state 1420 to the de-queue state 1435 in response to any of these conditions being satisfied. The state machine 1400 transitions from the waiting state 1430 to the de-queue state 1435 (as indicated by the arrow 1438) in response to the ring buffer or queue being removed by the OS/LLD functionality.

In the de-queue state 1435, the state machine 1400 handles time slice, empty, or OS/LLD removal of the corresponding ring buffer or queue. The state machine 1400 then transitions from the de-queue state 1435 to the idle state 1405, as indicated by the arrow 1440.

Figure 15:
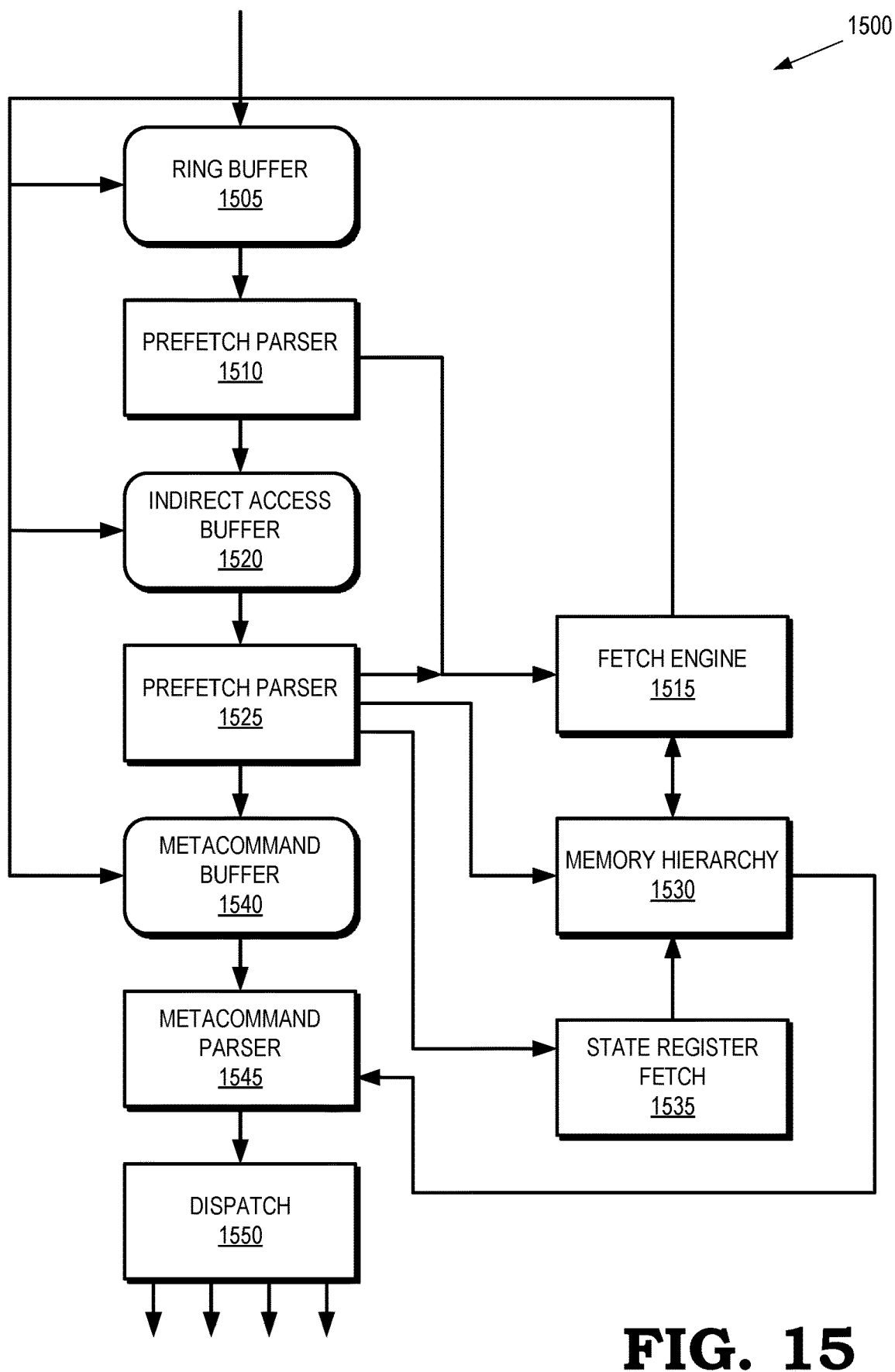
FIG. 15 is a block diagram of a meta-pipe fragment according to some embodiments.

FIG. 15 is a block diagram of a meta-pipe fragment 1500 according to some embodiments. The meta-pipe fragment 1500 is used to implement some embodiments of the meta-pipe fragments 315-317 shown in FIG. 3. The meta-pipe fragment 1500 operates in the meta-pipe domain 915 shown in FIG. 9. The meta-pipe fragment 1500 fetches command packets from ring buffers or queues that are activated and promoted by a preceding super pipe fragment such as the super pipe fragment 1400 shown in FIG. 14.

Ring buffers 1505 represent the ring buffers from the preceding super pipe fragment that have been activated and promoted. The meta-pipe fragment 1500 also receives key entries for descriptors of the activated queues in the ring buffer 1505 from the preceding super pipe fragment.

A first prefetch parser 1510 transmits instructions to a fetch engine 1515 to begin prefetching command packets or metacommands from the ring buffers 1505. In some embodiments, the ring buffer 1505 includes commands with pointers or indices that are used for indirect fetching of the command packets or metacommands. In that case, the meta-pipe fragment 1500 performs multiple levels of fetching. Each level of indirection requires a memory access latency compensation buffer and an additional prefetch parser engine to decode data retrieval metacommands and initiate DMA fetch for the application data stream. For example, the meta-pipe fragment 1500 can include an indirect access buffer 1520 to compensate for the memory access latency by buffering the pointers or indices used for indirect fetching. The meta-pipe fragment 1500 also includes a second prefetch parser 1525 that transmits instructions to the fetch engine 1515 to prefetch command packets or metacommands indicated by the pointers or indices. Indirection can be performed using a complete address pointer that is retrieved from a primary metacommand or indirection can be performed using an input assembler index that is used to address 3-D graphics data via a surface base register in a state register pool.

In the illustrated embodiment, the second prefetch parser 1525 is able to prefetch command packets or metacommands from a memory hierarchy 1530, which includes memory elements, caches, registers, and the like. The second prefetch parser 1525 can also initiate fetching of information in state registers by transmitting instructions to a state register fetch block 1535.

The meta-pipe fragment 1500 includes a metacommand buffer 1540 that is used to hide latency of a metacommand parser 1545 by buffering metacommands that are fetched or prefetched by other elements of the meta-pipe fragment 1500. The metacommand parser 1545 decodes the fetched or prefetched metacommands. Some embodiments of the metacommand parser 1545 also initiate memory access to retrieve data that can be used by a dispatch block 1550 to dispatch command packets or metacommands for processing by one or more subsequent virtual pipe fragments. The dispatch block 1550 organizes and dispatches data in a format that is determined based on the processing requirements of the subsequent virtual pipe fragments, which differ between different types of applications that implement different programming models. The dispatch block 1550 can implement grid dispatching or workgroup dispatching for compute and graphics data in 3-D graphics data processing. Some embodiments of the meta-pipe fragment 1500 also support interrupts and context preemption.

Figure 16:
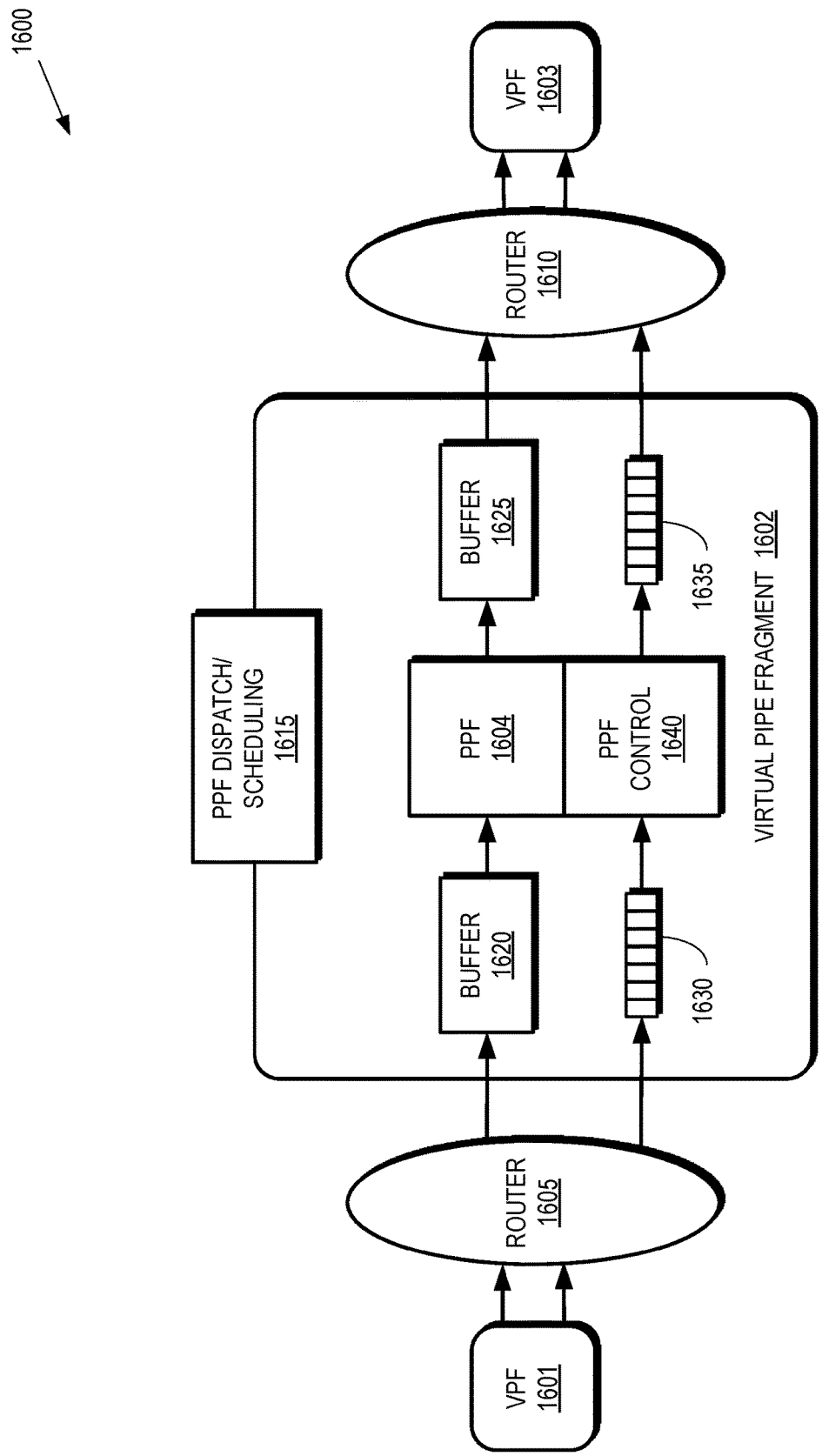
FIG. 16 is a block diagram illustrating virtual pipe fragments in a virtual graphics pipeline according to some embodiments.

FIG. 16 is a block diagram illustrating virtual pipe fragments in a virtual graphics pipeline according to some embodiments. The virtual pipe fragments 1601, 1602, 1603 (collectively referred to herein as "the virtual pipe fragments 1601-1603") are used to implement some embodiments of the virtual pipe fragments 320-322 shown in FIG. 3. The virtual pipe fragments 1601-1603 are implemented in the virtual pipe domain 920 shown in FIG. 9.

The virtual pipe fragments 1601-1603 are associated with a virtual graphics pipeline that includes a super pipe fragment such as the super pipe fragment 1400 shown in FIG. 14 and a meta-pipe fragment such as the meta-pipe fragment 1500 shown in FIG. 15. The virtual pipe fragment 1601 receives data dispatched by a dispatch block in the meta-pipe fragment such as the dispatch block 1550 shown in FIG. 15. The data is processed by the virtual pipe fragment 1601, routed to the virtual pipe fragment 1602 by the router 1605, processed by the virtual pipe fragment 1602, routed to the virtual pipe fragment 1603 by the router 1610, and then processed by the virtual pipe fragment 1603. Some embodiments of the virtual graphics pipeline include more or fewer virtual pipe fragments and corresponding routers.

The virtual pipe fragments 1601-1603 are configured by selecting physical pipe fragments 1604 to implement the virtual pipe fragments 1601-1603 and defining the processing requirements for applications that are being executed by the virtual graphics pipeline. The physical pipe fragments 1604 can be implemented as either a firmware thread that is executed on programmable micro-engines or a shader kernel that is executed on respective shader computing units. The physical pipe fragments 1604 can also be implemented as fixed function hardware blocks or a sequence of fixed function hardware blocks that are configured using corresponding state information and allocated to support the functionality of the virtual pipe fragments 1601-1603. The virtual pipe fragments 1601-1603 schedule tasks for execution by the corresponding physical pipe fragments 1604. For example, the virtual pipe fragments 1602 includes a physical pipe fragment dispatch/scheduling block 1615. The block 1615 can be internal to the virtual pipe fragment 1602, external to the virtual pipe fragment 1602, or mixed internal/external depending on the mapping to the micro-engine, shader compute unit, or fixed function hardware or firmware resources.

The virtual pipe fragment 1602 also includes a data input buffer 1620 for buffering data that is input to the physical pipe fragment 1604 and a data output buffer 1625 for buffering data that is output from the physical pipe fragment 1604. The buffers 1620, 1625 can be implemented as separate entities or pre-allocated registers or they can be allocated space in a memory hierarchy for other buffer. Input and output command queues or state queues for the physical pipe fragment 1604 are also implemented in some embodiments of the virtual pipe fragment 1602. The virtual pipe fragment 1602 also includes input and output command/state/ID queues 1630, 1635 for holding information that is provided to a physical pipe fragment control block 1640 that provides operation control and sequencing functionality for the physical pipe fragment 1604.

Some embodiments of the routers 1605, 1610 implement join or fork functionality that allows additional virtual pipe fragments to be joined to the virtual pipeline or fork from the virtual pipe fragment. For example, the router 1605 can use join functionality to join another virtual pipe fragment (not shown) to the virtual graphics pipeline at the virtual pipe fragment 1602. For another example, the router 1610 can use fork functionality to fork the output data stream from the virtual pipe fragment 1602 to another virtual pipe fragment (not shown) in the virtual graphics pipeline. The joint-fork functionality allows the on-chip virtual graphics pipelines to be arranged in multiple possible shapes, which can be used to match load balancing requirements between the virtual graphics and compute pipelines.

Figure 17:
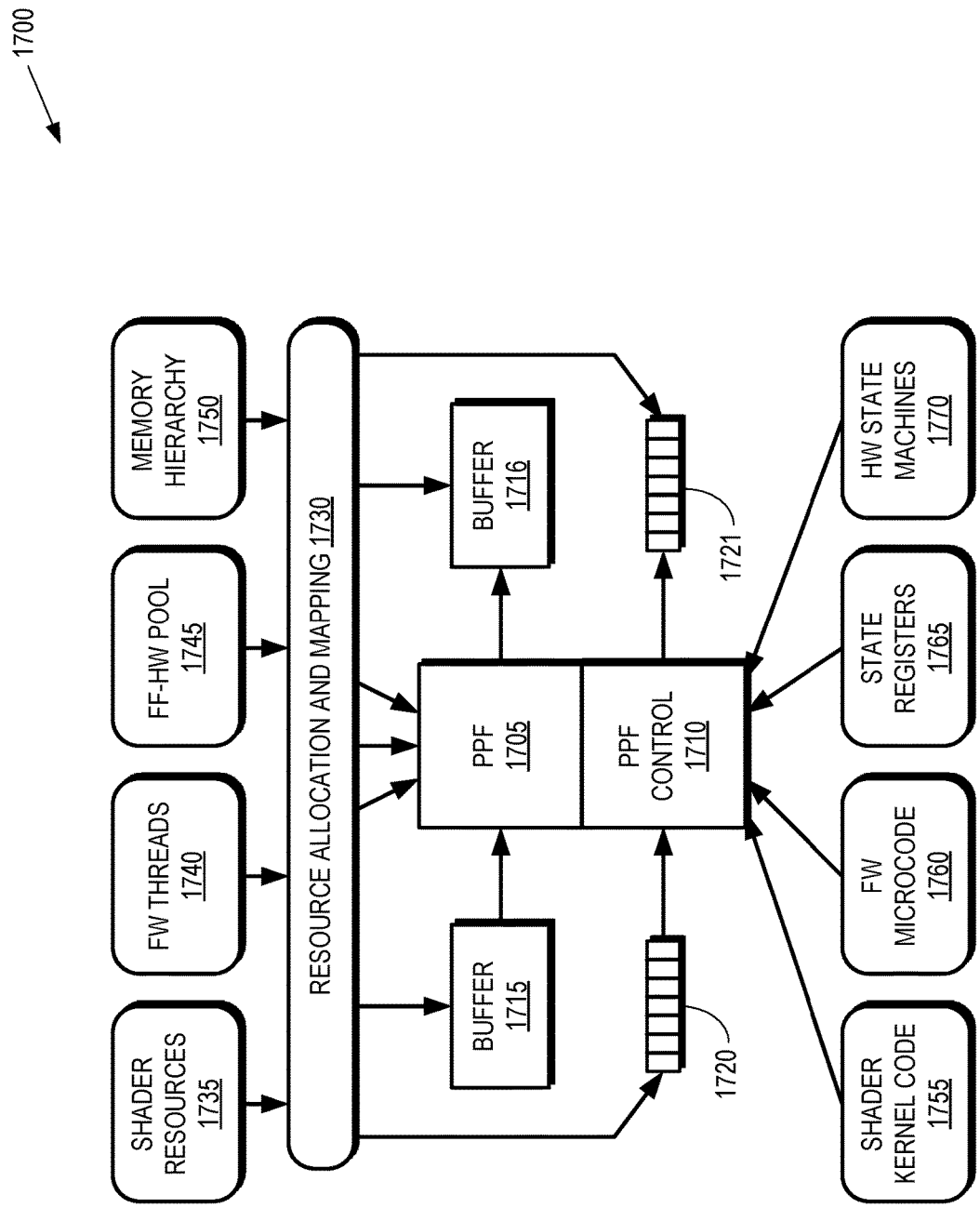
FIG. 17 is a block diagram illustrating allocation of resources of a graphics processing system to a virtual pipe fragment according to some embodiments.

FIG. 17 is a block diagram illustrating allocation of resources of a graphics processing system to a virtual pipe fragment 1700 according to some embodiments. The virtual pipe fragment 1700 is used to implement some embodiments of the virtual pipe fragment 1600 shown in FIG. 16. The virtual pipe fragment 1700 therefore includes physical pipe fragments 1705 and a physical pipe fragment control block 1710 that correspond to the physical pipe fragments 1604 and the physical pipe fragment control block 1640 shown in FIG. 16. The virtual pipe fragment 1700 also includes input and output buffers 1715, 1716 and input and output command/state/ID queues 1720, 1721 that correspond to the same entities in the virtual pipe fragment 1600 shown in FIG. 16.

In the illustrated embodiment, the graphics processing system includes shared resources such as hardware shader resources 1735 including one or more graphics processing cores in a unified shader pool, firmware threads 1740 that are executed on one or more hardware RISC micro-engines, a pool 1745 of fixed function hardware that are configured to perform different functions, and a memory hierarchy 1750 that includes memory elements such as a DRAM, queues, buffers, registers, caches, and the like. A resource allocation and mapping block 1730 is used to allocate the resources of the graphics processing system to the virtual pipe fragment 1700 and establish the mapping between the resources and the entities in the virtual pipe fragment 1700. For example, shader resources 1735, firmware threads 1740, fixed function hardware units 1745, or a combination thereof can be allocated to implement the physical pipe fragments 1705. For another example, resources of the memory hierarchy 1750 can be allocated to implement the input and output buffers 1715, 1716 and the input and output command/state/ID queues 1720, 1721. Some embodiments of the resource allocation and mapping block 1730 are implemented in the VPF control block 342 shown in FIG. 3.

The resources of the graphics processing system also include shader kernel code 1755, firmware microcode 1760, state registers 1765, and hardware state machines 1770. These resources can be allocated to implement the physical pipe fragment control block 1710. For example, shader kernel code 1755, firmware microcode 1760, or a combination thereof can be used to implement the functionality of the physical pipe fragment control block 1710. The state registers 1765 and the hardware state machines 1770 can then be configured to store and utilize state information to determine the current operational state of the physical pipe fragment control block 1710, which can provide control signaling to the physical pipe fragment 1705 based on its operational state and other information available to the physical pipe fragment control block 1710. In some embodiments, control and sequencing in the physical pipe fragment 1705 depends on processing data-path selection: executable kernel code 1755 provides control and sequencing for shader resources 1735, firmware microcode 1760 provides control and sequencing for the firmware threads 1740 executing on micro-engines, the hardware state machines 1770 or hard-wired microcode provide control and sequencing for the fixed function hardware blocks 1745. In some cases, state control bit fields in reconfigurable GPU state registers of a synchronous flow are used to determine the control and sequencing signals.

Figure 18:
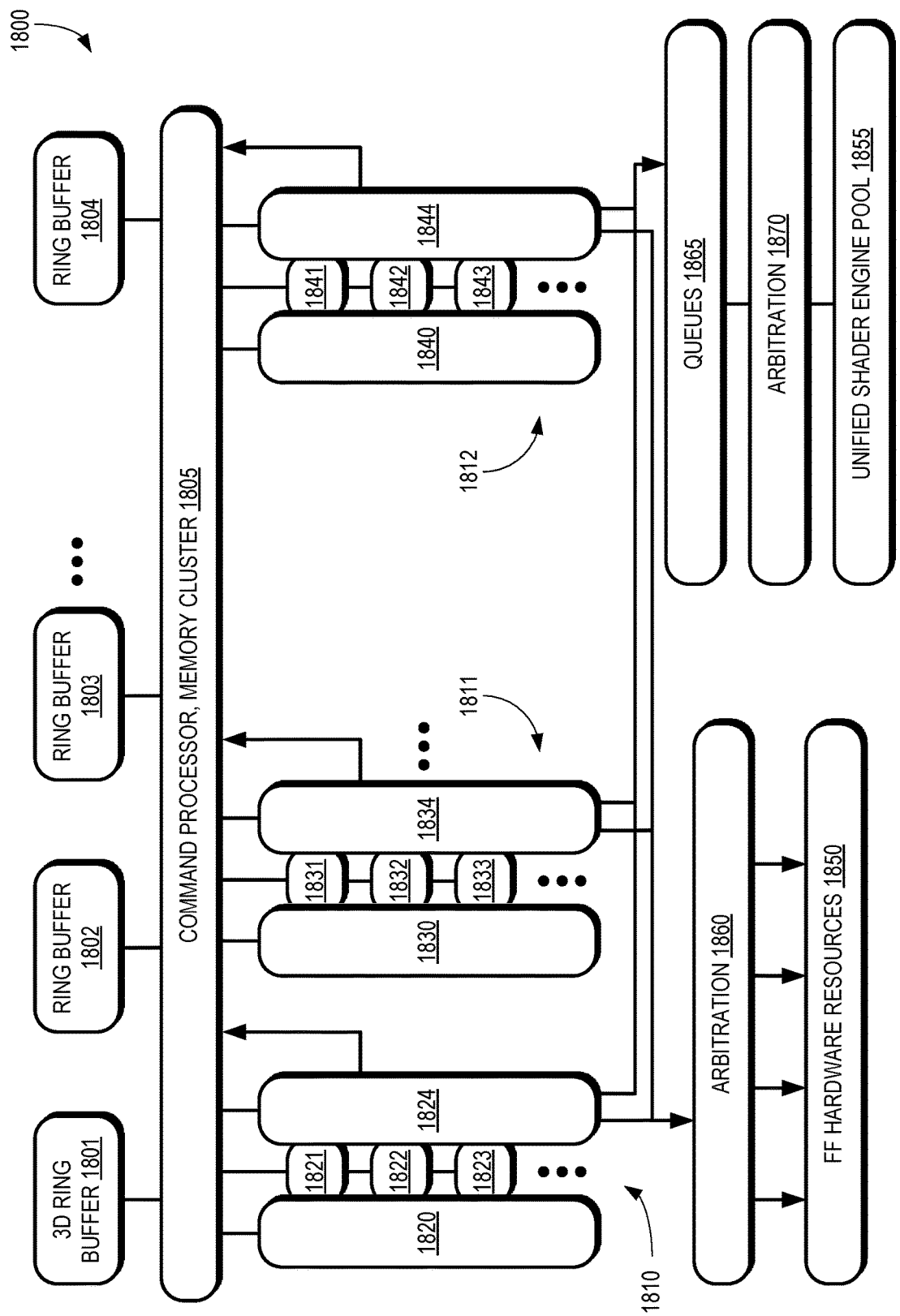
FIG. 18 is a block diagram of a graphics processing system that includes a configurable number of virtual graphics pipelines that are each implemented using a configurable number of pipeline fragments according to some embodiments.

FIG. 18 is a block diagram of a graphics processing system 1800 that includes a configurable number of virtual graphics pipelines that are each implemented using a configurable number of pipeline fragments according to some embodiments. The graphics processing system 1800 is used to implement some embodiments of the graphics processing system 300 shown in FIG. 3.

The graphics processing system includes a set of ring buffers 1801, 1802, 1803, 1804 that are collectively referred to herein as "the ring buffers 1801-1804." As discussed herein with regard to FIG. 11, the ring buffers 1801-1804 include a set of entries specified by a head pointer and a tail pointer. The entries in the ring buffers 1801-1804 can hold command packets, metacommands, pointers to commands, indices for commands, and the like. In the illustrated embodiment, the ring buffer 1801 is reserved for holding information related to 3-D graphics processing. Information is provided to the ring buffers 1801-1804 by processor cores such as cores implemented in a CPU. The ring buffers 1801-1804 can be dynamically allocated (or de-allocated) from a memory hierarchy in response to the instantiation of virtual graphics pipelines or the removal of virtual graphics pipelines. The ring buffers 1801-1804 are associated with corresponding context status descriptors.

A block 1805 includes a command processor, a memory hierarchy, and a memory resource cluster that is used to instantiate and allocate resources to virtual graphics pipelines 1810, 1811, 1812, which are collectively referred to herein as "the virtual graphics pipelines 1810-1812." The block 1805 maps the ring buffers 1801-1804 to different virtual graphics pipelines 1810-1812 and the context or status of the virtual graphics pipelines 1810-1812 is determined by the corresponding context status descriptors. The block 1805 can retrieve commands or data from the ring buffers 1801-1804 and route the commands or data to the appropriate virtual graphics pipelines 1810-1812 based on the mapping. The block 1805 can also remove one or more of the virtual graphics pipelines 1810-1812, e.g., in response to the virtual graphics pipeline completing tasks in a thread allocated to the virtual graphics pipeline. The block 1805 then deallocates resources of the removed virtual graphics pipeline.

The virtual graphics pipelines 1810-1812 include configuration/control blocks, super pipe fragments, meta-pipe fragments virtual pipe fragments, and a mapping to allocated physical pipe fragments and memory resources. For example, the virtual graphics pipeline 1810 includes a configuration/control block 1820, a super pipe fragment 1821, a meta-pipe fragment 1822, one or more virtual pipe fragments 1823, and a mapping 1824 to the physical pipe fragments and memory resources that are allocated to the virtual graphics pipeline 1810. For another example, the virtual graphics pipeline 1811 includes a configuration/control block 1830, a super pipe fragment 1831, a meta-pipe fragment 1832, one or more virtual pipe fragments 1833, and a mapping 1834 to the physical pipe fragments and memory resources that are allocated to the virtual graphics pipeline 1811. For yet another example, the virtual graphics pipeline 1812 includes a configuration/control block 1840, a super pipe fragment 1841, a meta-pipe fragment 1842, one or more virtual pipe fragments 1843, and a mapping 1844 to the physical pipe fragments and memory resources that are allocated to the virtual graphics pipeline 1812.

The virtual graphics pipelines 1810-1812 share fixed function hardware resources 1850 and shader engines from a unified shader engine pool 1855. The fixed function hardware resources 1850 and the unified shader engine pool 1855 contain multiple physical processing blocks or physical pipe fragments that can be allocated to any pipeline fragments in one of the virtual graphics pipeline 1810-1812. Thus, the number of virtual graphics pipelines 1810-1812 that are instantiated at any given time can be larger or smaller than the number of physical processing blocks or physical pipe fragments in the fixed function hardware resources 1850 or the unified shader engine pool 1855.

The virtual graphics pipelines 1810-1812 access the shared fixed function hardware resources 1850 via access arbitration 1860 that arbitrates between access requests by the different virtual graphics pipelines 1810-1812, as discussed herein with regard FIG. 8. The shared fixed function hardware resources 1850 can include fixed function hardware units configured to perform pixel shading, scan conversion, primitive assembly, vertex shading, graphics shading, hull shading, local shading, and the like.

The virtual graphics pipelines 1810-1812 access the unified shader pool 1855 via a set of queues 1865. Some embodiments of the queues 1865 include thread group queues that are used to support multiple shader pipes that concurrently issue executable compute kernels to an arbitration and dispatch unit 1870. The arbitration and dispatch unit 1870 can perform arbitration in the manner discussed herein with regard to FIG. 8. Some embodiments of the arbitration and dispatch unit 1870 form thread group queues that hold SIMD compute waves for dispatch to the unified shader pool 1855. The multiple shader pipes can be referred to as asynchronous compute engines, as discussed herein. Memory hierarchy and on-chip buffer resources are shared by all active processing SIMD computing and fixed function hardware blocks in the fixed function hardware resources 1850 and the unified shader engine pool 1855.

Figure 19:
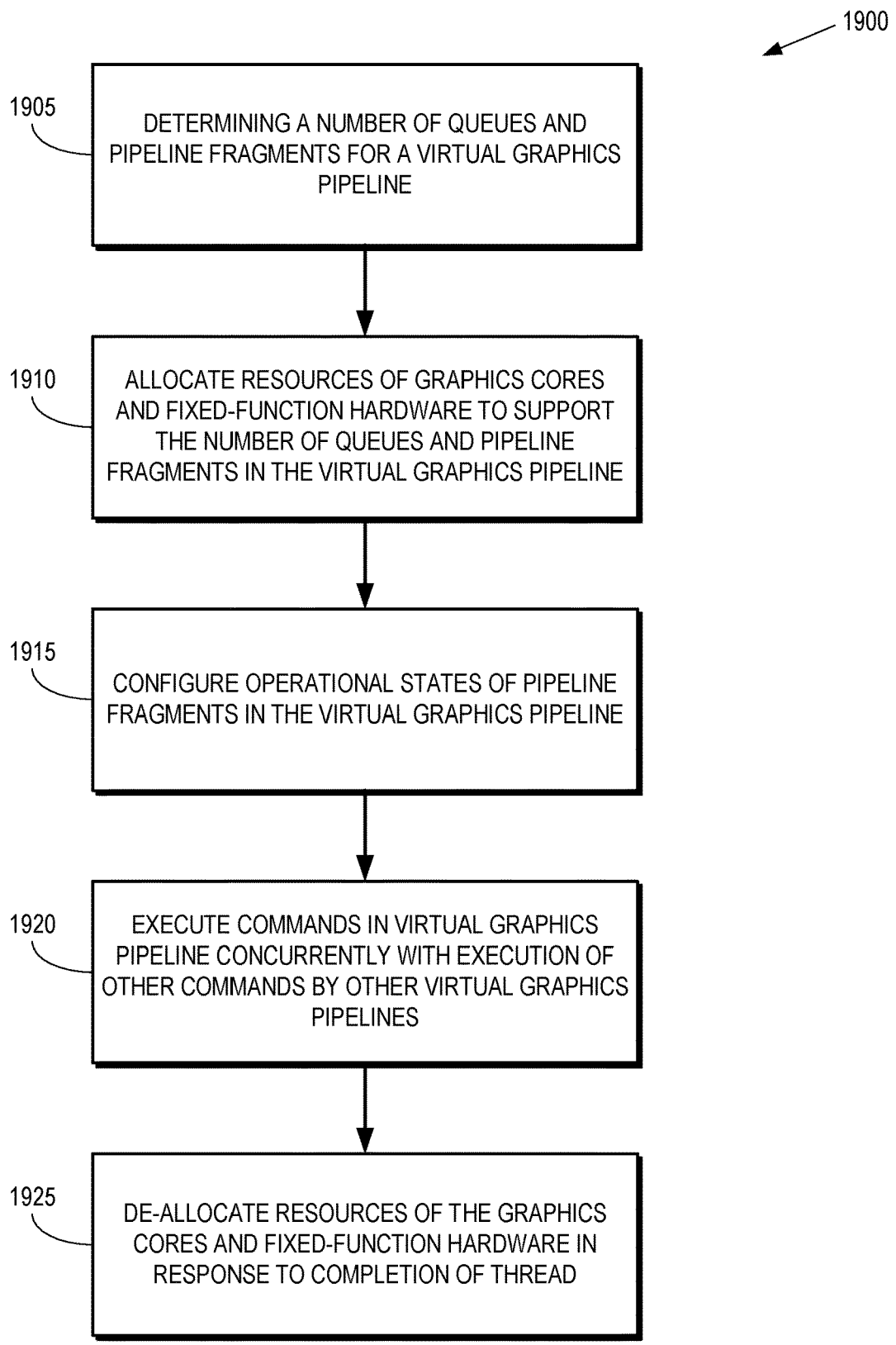
FIG. 19 is a flow diagram of a method of instantiating a virtual graphics pipeline according to some embodiments.

FIG. 19 is a flow diagram of a method 1900 instantiating a virtual graphics pipeline according to some embodiments. The method 1900 is implemented in some embodiments of the graphics processing system 300 shown in FIG. 3, the graphics processing system 400 shown in FIG. 4, the graphics processing system 600 shown in FIG. 6, and the graphics processing system 700 shown in FIG. 7.

At block 1905, the graphics processing system determines a number of queues and pipeline fragments for a virtual graphics pipeline. The number of queues or the number of pipeline fragments can be determined based on the requirements of an application that is generating the thread for execution on the virtual graphics pipeline. The number of pipeline fragments can include a super pipe fragment, a meta-pipe fragment, and one or more virtual pipe fragments. The queues and pipeline fragments can be allocated in response to user input, e.g., in response to a user initiating an application that generates the thread or in response to a system event such as an operating system or application generating a new thread.

At block 1910, the graphics processing system allocates shared resources to support the queues and pipeline fragments of the virtual graphics pipeline. The shared resources include graphics processing cores that can be a part of a unified shader pool and fixed function hardware, as discussed herein. The allocated resources can be referred to as physical pipe fragments. The resources of the graphics processing system are shared with other virtual graphics pipelines so that the virtual graphics pipelines can concurrently execute commands using the shared resources.

At block 1915, the operational states of the pipeline fragments are configured using state information associated with the virtual graphics pipeline. As discussed herein, the state information can be stored in and accessed from queues, registers, ring buffers, caches, or other memory elements.

At block 1920, the virtual graphics pipeline executes one or more commands that are retrieved from the queues that are associated with the virtual graphics pipeline. The commands are executed using the shared hardware resources that are allocated to the virtual graphics pipeline. The virtual graphics pipeline executes the commands concurrently with other virtual graphics pipelines executing other commands using the shared resources of the graphics processing system.

At block 1925, the graphics processing system de-allocates the shared resources that were allocated to the virtual graphics pipeline. The shared resources can be de-allocated in response to the graphics processing system terminating the virtual graphics pipeline e.g., because the virtual graphics pipeline has completed executing the commands in the thread associated with the virtual graphics pipeline. De-allocating the shared resources includes deallocating resources of the shared graphics cores, the fixed function hardware, or firmware emulations of the fixed function hardware.

Figure 20:
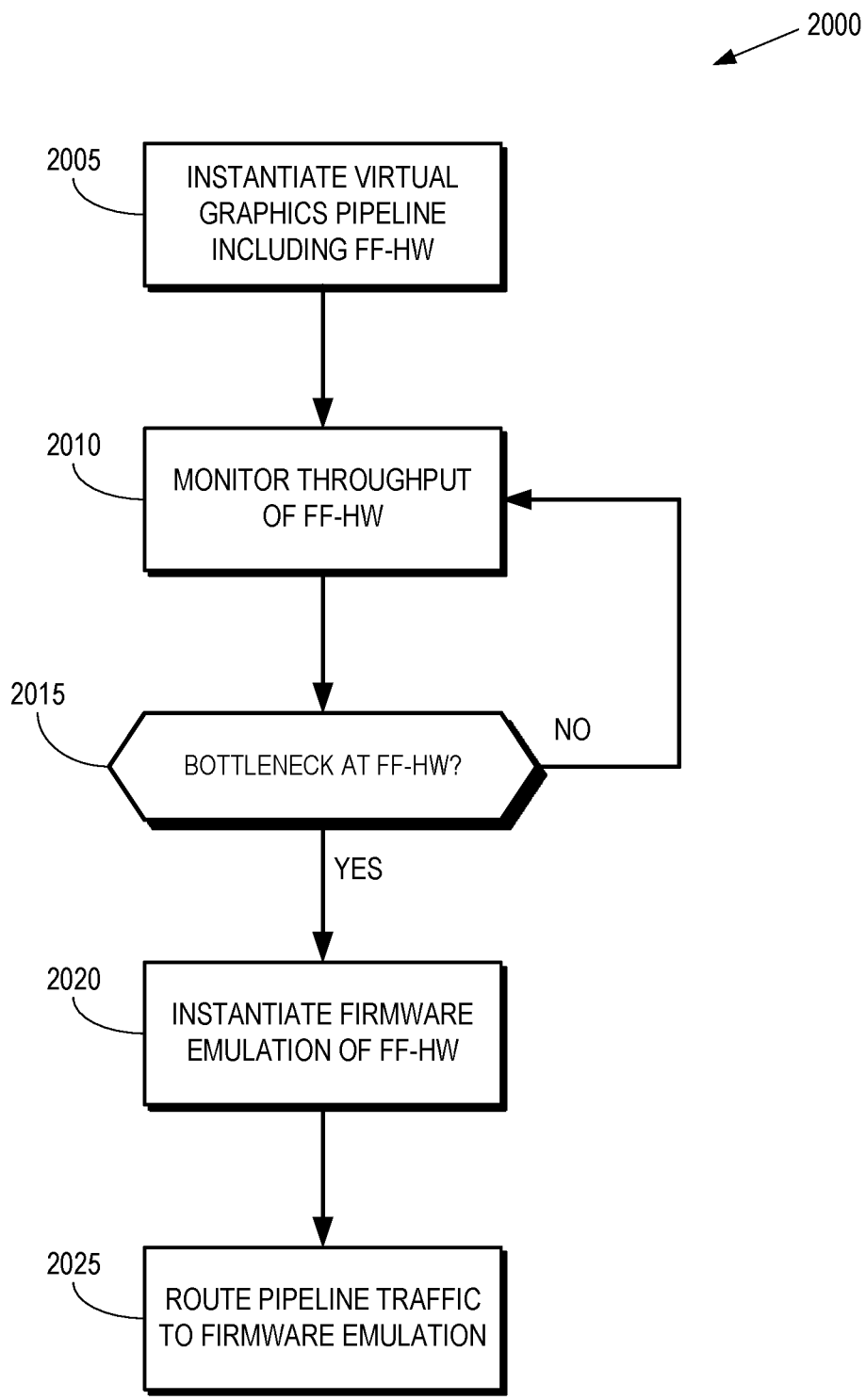
FIG. 20 is a flow diagram of a method for selectively emulating fixed function hardware using a firmware emulation according to some embodiments.

FIG. 20 is a flow diagram of a method 2000 for selectively emulating fixed function hardware using a firmware emulation according to some embodiments. The method 2000 is implemented in some embodiments of the graphics processing system 300 shown in FIG. 3, the graphics processing system 400 shown in FIG. 4, the graphics processing system 600 shown in FIG. 6, and the graphics processing system 700 shown in FIG. 7.

At block 2005, the graphics processing system instantiates a virtual graphics pipeline including resources of a fixed function hardware unit. For example, a virtual pipe fragment can transmit calls to the fixed function hardware unit to request that the fixed function hardware unit perform a particular operation and return results of the operation. As discussed herein, the fixed function hardware unit can be shared by multiple virtual graphics pipelines or pipeline fragments within a single virtual graphics pipeline.

At block 2010, the graphics processing system monitors a throughput of the fixed function hardware unit or other indication of the loading of the fixed function hardware units such as queue statuses, buffer occupancy, and the like.

At decision block 2015, the graphics processing system determines whether there is a bottleneck at the fixed function hardware unit. For example, the throughput of the fixed function hardware unit can be compared to a threshold value. If the throughput falls below the threshold value, the graphics processing system detects a bottleneck at the fixed function hardware unit. The other indicators such as the queue status or the buffer occupancy can also be compared to corresponding thresholds to detect bottlenecks in the fixed function hardware unit. As long as the graphics processing system does not detect a bottleneck at the fixed function hardware unit, the graphics processing system continues to monitor throughput of the fixed function hardware unit at block 2010. If the graphics processing system detects a bottleneck, the method 2000 flows to block 2020.

At block 2020, the graphics processing system instantiates a firmware emulation of the fixed function hardware unit, e.g., using shader firmware that is executing on one or more graphics processing kernels in the graphics processing system. At block 2025, the graphics processing system routes pipeline traffic to the firmware emulation of the fixed function hardware unit instead of routing the pipeline traffic to the fixed function hardware unit. Re-routing the pipeline traffic to the firmware emulation can alleviate the bottleneck at the fixed function hardware unit and improve overall performance of the graphics processing system.

In some embodiments, the apparatus and techniques described above are implemented in a system comprising one or more integrated circuit (IC) devices (also referred to as integrated circuit packages or microchips), such as the graphics processing system including configurable virtual graphics pipelines described above with reference to FIGS. 1-20. Electronic design automation (EDA) and computer aided design (CAD) software tools are used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device is stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
   a plurality of shared resources comprising:
      a plurality of programmable processing cores configured to process graphics primitives and corresponding data; and
      a plurality of fixed-function hardware units, wherein the shared resources are allocated to implement a configurable number of virtual graphics pipelines, wherein
         the virtual graphics pipelines are to concurrently execute commands that are fed to each virtual graphics pipeline using at least one buffer;
         each virtual graphics pipeline includes a number of shared resources dynamically configurable in response to at least one of a system event or user input;
         each virtual graphics pipeline is mapped to memory hierarchy resources of the apparatus based on a mapping that is dynamically adjustable in response to one or more of at least one of system event or at least one user input; and the virtual graphics pipelines are reconfigured in response to one or more at least one system event or at least one user input.

2. The apparatus of claim 1, further comprising:
a command processor configured to schedule and dispatch commands to a configurable number of queues, wherein
the configurable number of queues are configured to store packets comprising the commands.

3. The apparatus of claim 2, further comprising:
an application driver configured to allocate memory for the queues.

4. The apparatus of claim 3, wherein the command processor is further configured to activate the queues and synchronize applications based on priority and detected activity information.

5. The apparatus of claim 4, further comprising: a control unit configured to allocate the plurality of shared resources to the configurable number of virtual graphics pipelines.

6. The apparatus of claim 5, wherein the control unit is configured to modify the configurable number of virtual graphics pipelines that are implemented using the shared resources and to modify the configurable number of queues for storing packets comprising commands for execution by the modified configurable number of virtual graphics pipelines.

7. The apparatus of claim 6, wherein
each virtual graphics pipeline comprises a configurable number of virtual graphics pipe stages configured to execute commands using the shared resources; and
the control unit is configured to modify the configurable number of virtual graphics pipe stages.

8. The apparatus of claim 7, wherein the control unit is configured to modify at least one of the configurable number of virtual graphics pipelines, the configurable number of queues, or the configurable number of virtual graphics pipe stages in response to user input.

9. The apparatus of claim 7, wherein the control unit is configured to instantiate an emulation of at least one of the plurality of fixed-function hardware units on at least one of the programmable processing cores in response to detection of a bottleneck in the at least one of the plurality of fixed-function hardware units, and wherein the control unit is configured to reconfigure virtual graphics pipelines that utilize the at least one of the plurality of fixed-function hardware units to use the at least one emulated fixed-function hardware unit.

10. A method, comprising:
allocating resources of a plurality of programmable processing cores and a plurality of fixed-function hardware units of a processing unit to a configurable number of virtual graphics pipelines, wherein each virtual graphics pipeline includes a configurable number of pipeline stages and is mapped to resources of a memory hierarchy;
allocating memory resources including at least one buffer for storing packets including commands;
responsive to providing the commands to the configurable number of pipelines using the at least one buffer, concurrently executing the commands in the configurable number of pipelines; and
reconfiguring the virtual graphics pipelines in response to one or more of at least one system event or at least one user input.

11. The method of claim 10, further comprising:
dispatching the commands to a configurable number of queues for execution by pipelines associated with the configurable number of queues.

12. The method of claim 11, further comprising:
activating the queues and synchronizing applications based on priority and detected activity information.

13. The method of claim 12, further comprising:
mapping the configurable number of pipeline stages to the memory hierarchy.

14. The method of claim 11, further comprising:
modifying the configurable number of pipelines that are implemented using the resources of the plurality of programmable processing cores and the plurality of fixed-function hardware units.

15. The method of claim 14, further comprising:
modifying the configurable number of queues for storing packets including commands for execution by the modified configurable number of pipelines.

16. The method of claim 10, further comprising:
modifying a configurable number of pipeline stages configured to execute commands using resources of at least one of the plurality of programmable processing cores and the plurality of fixed-function hardware units.

17. The method of claim 16, further comprising:
modifying at least one of the configurable number of pipelines or the configurable number of pipeline stages in response to user input.

18. The method of claim 10, further comprising:
instantiating an emulation of at least one of the plurality of fixed-function hardware units on at least one of the programmable processing cores in response to detection of a bottleneck in the at least one of the plurality of fixed-function hardware units; and
reconfiguring at least one of the virtual graphics pipelines that utilizes the at least one of the plurality of fixed-function hardware units to use the at least one emulated fixed-function hardware unit.

19. A method, comprising:
allocating memory resources including at least one buffer for storing packets including commands;
responsive to providing the commands to a configurable number of pipelines using the at least one buffer, concurrently executing the commands on a first number of virtual graphics pipelines that are implemented using resources of a plurality of programmable processing cores and a plurality of fixed-function hardware units;
reconfiguring the virtual graphics pipelines in response to one or more of at least one system event or at least one user input such that a second number of virtual graphics pipelines, different than the first number, are implemented using the resources of the plurality of programmable processing cores and the plurality of fixed-function hardware units; and
concurrently executing commands on the second number of virtual graphics pipelines subsequent to the reconfiguration.

20. The method of claim 19, further comprising:
instantiating an emulation of at least one of the plurality of fixed-function hardware units on at least one of the programmable processing cores in response to detection of a bottleneck in the at least one of the plurality of fixed-function hardware units; and
reconfiguring at least one of the virtual graphics pipelines that utilizes the at least one of the plurality of fixed-function hardware units to use the at least one emulated fixed-function hardware unit.

\* \* \* \* \*